(12) United States Patent
Baylon et al.

(10) Patent No.: US 9,532,059 B2
(45) Date of Patent: Dec. 27, 2016

(54) METHOD AND APPARATUS FOR SPATIAL SCALABILITY FOR VIDEO CODING

(75) Inventors: David M. Baylon, San Diego, CA (US); Wei-Ying Kung, San Diego, CA (US); Ajay K. Luthra, San Diego, CA (US); Koohyar Minoo, San Diego, CA (US); Krit Panusopone, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 1140 days.

(21) Appl. No.: 13/416,838

(22) Filed: Mar. 9, 2012

(65) Prior Publication Data

US 2012/0170646 A1 Jul. 5, 2012

Related U.S. Application Data

(63) Continuation-in-part of application No. 13/253,793, filed on Oct. 5, 2011, now abandoned.
(Continued)

(51) Int. Cl.
H04N 19/44 (2014.01)
H04N 19/12 (2014.01)
(Continued)

(52) U.S. Cl.
CPC .......... H04N 19/12 (2014.11); H04N 19/122 (2014.11); H04N 19/137 (2014.11); H04N 19/14 (2014.11);
(Continued)

(58) Field of Classification Search
USPC .................................................. 375/240.26
See application file for complete search history.

(56) References Cited

U.S. PATENT DOCUMENTS 4,924,310 A 5/1990 von Brandt
5,148,269 A 9/1992 de Haan et al.
(Continued)

FOREIGN PATENT DOCUMENTS

CN 101478672 A 7/2009
EP 0634873 1/1995
(Continued)

OTHER PUBLICATIONS

Andreopoulos Y et al.: "Spatio-temporal-snr scalable wavelet coding with motion compensated dct base-layer architectures", Proceedings of International Conference on Image Processing, vol. 2, Sep. 14, 2003, pp. 795-798.
(Continued)

Primary Examiner — Leron Beck
Assistant Examiner — Kehinde O Abimbola
(74) Attorney, Agent, or Firm — Young Basile Hanlon & MacFarlane, P.C.

(57) ABSTRACT

In a video distribution system, a divider to segment an input video stream into partitions for each of a plurality of channels of the video stream is provided. A channel analyzer is coupled to the divider wherein the channel analyzer decomposes the partitions. An encoder is coupled to the channel analyzer to encode the decomposed partitions into an encoded bitstream wherein the encoder receives coding information from at least one of the plurality of channels to be used in encoding the decomposed partitions into the encoded bitstream. A decoder receives the coded bitstream to decode the received bitstream and to reconstruct the input video stream. The decoder uses the coding information to decode the bitstream.

18 Claims, 20 Drawing Sheets

Related U.S. Application Data

(60) Provisional application No. 61/389,930, filed on Oct. 5, 2010, provisional application No. 61/451,824, filed on Mar. 11, 2011.

(51) Int. Cl.

| | | |
|---|---|---|
| *H04N 19/172* | (2014.01) | |
| *H04N 19/46* | (2014.01) | |
| *H04N 19/63* | (2014.01) | |
| *H04N 19/122* | (2014.01) | |
| *H04N 19/61* | (2014.01) | |
| *H04N 19/14* | (2014.01) | |
| *H04N 19/137* | (2014.01) | |
| *H04N 19/17* | (2014.01) | |
| *H04N 19/635* | (2014.01) | |
| *H04N 19/20* | (2014.01) | |
| *H04N 19/60* | (2014.01) | |

(52) U.S. Cl.
CPC ............ *H04N 19/17* (2014.11); *H04N 19/172* (2014.11); *H04N 19/20* (2014.11); *H04N 19/46* (2014.11); *H04N 19/61* (2014.11); *H04N 19/619* (2014.11); *H04N 19/63* (2014.11); *H04N 19/635* (2014.11); *H04N 19/649* (2014.11)

(56) References Cited

U.S. PATENT DOCUMENTS

| | | |
|---|---|---|
| 5,337,086 A | 8/1994 | Fujinami |
| 5,469,273 A | 11/1995 | Demura |
| 5,510,842 A | 4/1996 | Phillips et al. |
| 5,512,952 A | 4/1996 | Iwamura |
| 5,532,744 A | 7/1996 | Akiwumi-Assani et al. |
| 5,617,541 A | 4/1997 | Albanese et al. |
| 5,731,840 A | 3/1998 | Kikuchi et al. |
| 5,761,423 A | 6/1998 | Lee |
| 5,818,967 A | 10/1998 | Bhattacharjee et al. |
| 5,886,652 A | 3/1999 | Adachi et al. |
| 5,886,742 A | 3/1999 | Hibi et al. |
| 5,991,428 A | 11/1999 | Taniguchi |
| 5,991,447 A | 11/1999 | Eifrig et al. |
| 6,005,980 A | 12/1999 | Eifrig et al. |
| 6,104,751 A | 8/2000 | Artieri |
| 6,108,383 A | 8/2000 | Miller et al. |
| 6,157,326 A | 12/2000 | Van Der Vleuten et al. |
| 6,173,012 B1 | 1/2001 | Katta et al. |
| 6,212,235 B1 | 4/2001 | Nieweglowski et al. |
| 6,236,757 B1 | 5/2001 | Zeng et al. |
| 6,272,179 B1 | 8/2001 | Kadono |
| 6,289,049 B1 | 9/2001 | Kim et al. |
| 6,359,929 B1 | 3/2002 | Boon |
| 6,381,277 B1 | 4/2002 | Chun et al. |
| 6,473,460 B1 | 10/2002 | Topper |
| 6,542,541 B1 | 4/2003 | Luna et al. |
| 6,574,273 B1 | 6/2003 | Luna et al. |
| 6,600,786 B1 | 7/2003 | Prakash et al. |
| 6,687,303 B1 | 2/2004 | Ishihara |
| 6,711,209 B1 | 3/2004 | Lainema et al. |
| 6,711,211 B1 | 3/2004 | Lainema |
| 6,735,249 B1 | 5/2004 | Karczewicz et al. |
| 6,775,326 B2 | 8/2004 | Sekiguchi et al. |
| 6,778,553 B1 | 8/2004 | Chou |
| 6,987,888 B2 * | 1/2006 | Wang et al. ................ 382/236 |
| 7,116,830 B2 | 10/2006 | Srinivasan |
| 7,173,968 B1 | 2/2007 | Kutka et al. |
| 7,184,482 B2 | 2/2007 | Prakash et al. |
| 7,218,674 B2 | 5/2007 | Kuo |
| 7,253,831 B2 | 8/2007 | Gu |
| 7,263,125 B2 | 8/2007 | Lainema |
| 7,672,377 B2 | 3/2010 | Heng et al. |
| 7,711,052 B2 | 5/2010 | Hannuksela et al. |
| 7,715,475 B1 | 5/2010 | Puri et al. |
| 7,773,670 B1 | 8/2010 | Puri et al. |
| 8,000,546 B2 | 8/2011 | Yang et al. |
| 8,170,102 B2 | 5/2012 | Bhaskaran et al. |
| 8,208,545 B2 | 6/2012 | Seo et al. |
| 8,254,469 B2 * | 8/2012 | Au et al. .................. 375/240.27 |
| 8,396,127 B1 | 3/2013 | Bultje et al. |
| 8,503,528 B2 | 8/2013 | Grange et al. |
| 8,559,451 B2 | 10/2013 | Shtalrid |
| 8,693,547 B2 | 4/2014 | Bankoski et al. |
| 2002/0009153 A1 | 1/2002 | Jeon et al. |
| 2002/0031272 A1 | 3/2002 | Bagni et al. |
| 2002/0071485 A1 | 6/2002 | Caglar et al. |
| 2002/0176502 A1 | 11/2002 | Rose et al. |
| 2002/0181790 A1 | 12/2002 | Nakata |
| 2002/0186753 A1 * | 12/2002 | Kolze ..................... H04B 1/71 375/147 |
| 2003/0012127 A1 * | 1/2003 | Kolze ..................... H04B 1/71 370/204 |
| 2003/0035484 A1 | 2/2003 | Prakash et al. |
| 2003/0138045 A1 | 7/2003 | Murdock et al. |
| 2003/0152149 A1 | 8/2003 | Denolf |
| 2003/0215018 A1 | 11/2003 | MacInnis et al. |
| 2004/0021078 A1 * | 2/2004 | Hagler ..................... 250/339.13 |
| 2004/0156437 A1 | 8/2004 | Lainema |
| 2004/0234144 A1 | 11/2004 | Sugimoto et al. |
| 2005/0180500 A1 | 8/2005 | Chiang et al. |
| 2005/0220352 A1 | 10/2005 | Wemelsfelder |
| 2005/0265447 A1 | 12/2005 | Park |
| 2005/0276323 A1 | 12/2005 | Martemyanov et al. |
| 2006/0034529 A1 | 2/2006 | Park et al. |
| 2006/0072664 A1 | 4/2006 | Kwon et al. |
| 2006/0093038 A1 | 5/2006 | Boyce |
| 2006/0098738 A1 | 5/2006 | Cosman et al. |
| 2006/0153304 A1 | 7/2006 | Prakash et al. |
| 2006/0158356 A1 * | 7/2006 | Kim ..................... G10L 19/008 341/51 |
| 2006/0251330 A1 | 11/2006 | Toth et al. |
| 2006/0262978 A1 * | 11/2006 | Wang et al. .................. 382/232 |
| 2006/0285589 A1 | 12/2006 | Hannuksela |
| 2007/0025441 A1 | 2/2007 | Ugur et al. |
| 2007/0064801 A1 | 3/2007 | Wang et al. |
| 2007/0136748 A1 * | 6/2007 | Rodriguez ........... H04N 21/235 725/37 |
| 2007/0177673 A1 | 8/2007 | Yang |
| 2007/0217508 A1 | 9/2007 | Shimada et al. |
| 2007/0274385 A1 | 11/2007 | He |
| 2007/0274388 A1 | 11/2007 | Lee et al. |
| 2008/0043783 A1 * | 2/2008 | Chai et al. ..................... 370/535 |
| 2008/0089712 A1 | 4/2008 | Nukada et al. |
| 2008/0152007 A1 | 6/2008 | Sekiguchi et al. |
| 2008/0181299 A1 | 7/2008 | Tian et al. |
| 2008/0187053 A1 | 8/2008 | Zhao et al. |
| 2008/0198902 A1 * | 8/2008 | Malladi ........................ 375/134 |
| 2008/0212673 A1 * | 9/2008 | Chen ........................ 375/240.02 |
| 2008/0310504 A1 | 12/2008 | Ye et al. |
| 2008/0310505 A1 * | 12/2008 | Yan et al. ................ 375/240.03 |
| 2008/0310512 A1 | 12/2008 | Ye et al. |
| 2008/0310745 A1 | 12/2008 | Ye et al. |
| 2009/0103617 A1 * | 4/2009 | Au et al. .................. 375/240.13 |
| 2009/0110066 A1 * | 4/2009 | Wang et al. .............. 375/240.12 |
| 2009/0122877 A1 | 5/2009 | Haskell |
| 2009/0150946 A1 * | 6/2009 | Rodriguez ........... H04N 21/235 725/87 |
| 2009/0196342 A1 | 8/2009 | Divorra Escoda et al. |
| 2009/0268805 A1 | 10/2009 | Shanableh et al. |
| 2009/0279600 A1 * | 11/2009 | Au et al. .................. 375/240.01 |
| 2009/0279615 A1 * | 11/2009 | Au et al. .................. 375/240.27 |
| 2010/0020879 A1 | 1/2010 | Pasquier et al. |
| 2010/0061444 A1 | 3/2010 | Wilkins et al. |
| 2010/0061697 A1 * | 3/2010 | Yasuda .......................... 386/68 |
| 2010/0074332 A1 | 3/2010 | Karczewicz et al. |
| 2010/0086028 A1 | 4/2010 | Tanizawa et al. |
| 2010/0086030 A1 | 4/2010 | Chen et al. .............. 375/240.12 |
| 2010/0098169 A1 | 4/2010 | Budagavi |
| 2010/0118945 A1 | 5/2010 | Wada et al. |
| 2010/0128796 A1 | 5/2010 | Choudhury |
| 2010/0142761 A1 | 6/2010 | Venkatapuram et al. |
| 2010/0208799 A1 | 8/2010 | Park et al. |
| 2010/0278234 A1 | 11/2010 | Jeong et al. |

(56) References Cited

U.S. PATENT DOCUMENTS

| | | |
|---|---|---|
| 2010/0329334 A1 | 12/2010 | Kim et al. |
| 2011/0007977 A1 | 1/2011 | Amonou et al. |
| 2011/0122950 A1 | 5/2011 | Ji et al. |
| 2011/0145516 A1 | 6/2011 | Adl-Tabatabai et al. |
| 2011/0235706 A1 | 9/2011 | Demircin et al. |
| 2011/0249743 A1 | 10/2011 | Zhao et al. |
| 2011/0293001 A1 | 12/2011 | Lim et al. |
| 2012/0014438 A1 | 1/2012 | Segall et al. |
| 2012/0014439 A1 | 1/2012 | Segall et al. |
| 2012/0014440 A1 | 1/2012 | Segall et al. |
| 2012/0014444 A1 | 1/2012 | Min et al. |
| 2012/0020408 A1 | 1/2012 | Chen et al. |
| 2012/0057630 A1 | 3/2012 | Saxena et al. |
| 2012/0082243 A1 | 4/2012 | Baylon et al. |
| 2012/0093221 A1* | 4/2012 | Rodriguez ............ H04L 65/607 375/240.13 |
| 2012/0106637 A1 | 5/2012 | Lee et al. |
| 2012/0106646 A1 | 5/2012 | Cammas et al. |
| 2012/0114035 A1 | 5/2012 | Nakagomi et al. |
| 2012/0128067 A1 | 5/2012 | Liu et al. |
| 2012/0300837 A1 | 11/2012 | Wilkins et al. |
| 2013/0022129 A1 | 1/2013 | Liu et al. |
| 2013/0034171 A1 | 2/2013 | Winken et al. |
| 2014/0029670 A1 | 1/2014 | Kung et al. |

FOREIGN PATENT DOCUMENTS

| | | |
|---|---|---|
| WO | WO02093488 | 11/2002 |
| WO | WO2004112398 | 12/2004 |
| WO | WO2005094083 | 10/2005 |
| WO | WO2009086761 | 7/2009 |
| WO | WO2010039728 A2 | 4/2010 |

OTHER PUBLICATIONS

Chen, Michael C., et al.; "Design and Optimization of a Differentially Coded Variable Block Size Motion Compensation System", IEEE 1996, 4 pp.

Chen, Xing C., et al.; "Quadtree Based Adaptive Lossy Coding of Motion Vectors", IEEE 1996, 4 pp.

Christopoulos C. et al. "The JPEG2888 Still Image Coding System: An Overview", IEEE Transations on consumer Electronics, vol. 46, No. 4.

Chung R H Y et al. "Efficient Block-Based Motion Segmentation Method using Motion Vector Consistency"; Proceedings of the Ninth Conference on Machine Vision Application: Tsukuba Science City, Japan; May 16-18, 2005.

Cicconi et al., "Efficient Region-Based Motion Estimation and Symmetry Oriented Segmentation for Image Sequence Coding," IEEE Trans. on Circuits and Systems for Video Technology, vol. 4, No. 3, Jun. 1994, pp. 357-364.

Congxia Dai; Escoda, O.D.; Peng Yin; Xin Li; Gomila, C., "Geometry-Adaptive Block Partitioning for Intra Prediction in Image & Video Coding," Image Processing, 2007. ICP 2007. IEEE International Conference on, vol. 6, no., pp. VI-85, VI-88, Sep. 16, 2007-Oct. 19, 2007.

Ebrahimi T Ed—Institute of Electrical and Electronics Engineers: "A new technique for motion field segmentation and coding for very low bitrate video coding applications"; Proceedings of the International Conference on Image Processing (ICIP); Austin, Nov. 13-16, 1994.

Ebrahimi, Touradj, et al.; "Joint motion estimation and segmentation for very low bitrate video coding", SPIE vol. 2501, 1995, 12 pp.

Glaser-Garrett, Jason, "A novel macroblock-tree algorithm for high-performance optimization of dependent video coding in H.264/AVC", Department of Computer Science, Harvey Mudd College, Date Unknown, 12 pp.

Guillotel, Philippe, et al.; "Comparison of motion vector coding techniques", SPIE vol. 2308, 1994, 11 pp.

Guo L, et al. "TE3: Simplified Geometry Block Partitioning", JCT-VC (Joint Collaborative Team on Video Coding) Meeting Jul. 21-Jul. 28, 2010.

Han et al, "Toward Jointly Optimal Spatial Prediction and Adaptive Transform in Video/Image Coding," ICASSP 2010 (Dallas, TX, Mar. 14-19, 2010).

Haridasan R. et al.; "Scalable coding of video objects", Proceedings of IEEE International Symposium on circuits and Systems, vol. 4. May 31, 1998.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

Jean-Pierre Leduc et al. Adaptive Motion-Compensated Wavelet Filtering for Image Sequence Coding; IEEE Transactions on Image Processing, vol. 6. No. 6 Jun. 1, 1997.

Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.

Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.

Liu, Bede, et al.; "A simple method to segment motion field for video coding", SPIE vol. 1818, Visual Communications and Image Processing 1992, 10 pp.

Liu, Bede, et al.; "New Fast Algorithms for the Estimation of Block Motion Vectors", IEEE Transactions on Circuits and Systems for Video Technology, vol. 3, No. 2, Apr. 1993, 10 pp.

Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.

Martin, Graham R., et al.; "Reduced Entropy Motion Compensation Using Variable Sized Blocks", SPIE vol. 3024, 1997, 10 pp.

Nicolas, H., et al.; "Region-based motion estimation using deterministic relaxation schemes for image sequence coding", IEEE 1992, 4 pp.

Nokia, Inc., Nokia Research Center, "MVC Decoder Description", Telecommunication Standardization Sector, Study Period 1997-2000, Geneva, Feb. 7, 2000, 99 pp.

Oehler K. L Ed.—Institute of Electrical and Electronics Engineers: "Region-based wavelet compression for very low bit rate video coding", International Conference on Image Processing. vol. 1., Sep. 16, 1996, pp. 573-576.

Orchard, Michael T.; "Exploiting Scene Structure in Video Coding", IEEE 1991, 5 pp.

Orchard, Michael T.; "Predictive Motion-Field Segmentation for Image Sequence Coding", IEEE Transactions on Circuits and Systems for Video Technology, vol. 3, No. 1, Feb. 1993, 17 pp.

Overview; VP7 Data Format and Decoder. Version 1.5. On2 Technologies, Inc. Dated Mar. 28, 2005.

Park, Jun Sung, et al., "Selective Intra Prediction Mode Decision for H.264/AVC Encoders", World Academy of Science, Engineering and Technology 13, (2006).

Salembier et al., "Segmentation-Based Video Coding system Allowing the Manipulation of Objects," IEEE Trans. on Circuits and Systems for Video Technology, vol. 7, No. 1, Feb. 1997, pp. 60-74.

Salembier Petal: "Region-Based Representations of Image and Video: Segmentation Tools for Multimedia Services", IEEE Transactions on circuits and Systems for video Technology, vol. 9, No. 8, Dec. 1, 1999, pp. 1147-1169.

Schiller, H., et al.; "Efficient Coding of Side Information in a Low Bitrate Hybrid Image Coder", Signal Processing 19 (1990) Elsevier Science Publishers B.V. 61-73, 13 pp.

Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.

(56) References Cited

OTHER PUBLICATIONS

Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Series H: Audiovisual and Multimedia Systems; Infrastructure of audiovisual services- Coding of moving video. H.264. Amendment 2: New profiles for professional applications. International Telecommunication Union. Dated Apr. 2007.
Series H: Audiovisual and Multimedia Systems; Infrastructure of audiovisual services- Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
Simpson RG: "Interband Prediction Method for Subband Image Coding", Proceedings of SPIE International Society for Optical Engineering, vol. 2418. Feb. 7, 1995, pp. 187-198.
Steliaros, Michael K., et al.; "Locally-accurate motion estimation for object-based video coding", SPIE vol. 3309, 1997, 11 pp.
Stiller, Christoph; "Motion-Estimation for Coding of Moving Video at 8 kbits with Gibbs Modeled Vectorfield Smoothing", SPIE vol. 1360 Visual Communications and Image Processing 1990, 9 pp.
Strobach, Peter; "Tree-Structured Scene Adaptive Coder", IEEE Transactions on Communications, vol. 38, No. 4, Apr. 1990, 10 pp.
Ulrich Benzler: "Spatial Scalable Video Coding Using a Combined Subband-DCT Approach", IEEE Transactions on Circuits and Systems for Video Technology, vol. 10, No. 7, Oct. 1, 2000, all pages.

VP6 Bitstream & Decoder Specification. Version 1.02. On2 Technologies, Inc. Dated Aug. 17, 2006.
VP6 Bitstream & Decoder Specification. Version 1.03. On2 Technologies, Inc. Dated Oct. 29, 2007.
Wiegand, Thomas, et al.; "Long-Term Memory Motion-Compensated Prediction", Publication Unknown, Date Unknown, 15 pp.
Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.
Wright, R. Glenn, et al.; "Multimedia—Electronic Technical Manual for ATE", IEEE 1996, 3 pp.
Zhang, Kui, et al.; "Variable Block Size Video Coding With Motion Prediction and Motion Segmentation", SPIE vol. 2419, 1995, 9 pp.
Bross, Benjamin et al.: "High EfficiexNCy Video Coding (HEVC) text specification draft 8," Joint Collaborative Team on Video Coding(JCT-VC) of ISO/IEC JTC1/SC29/WG11 and ITU-T SG16 WP3, 10th Meeting : Stockholm, SE Jul. 20, 2012 , JCTVC-J1003_d7.
Canadian Office Action in CA2812242, mailed Jan. 28, 2015. (no new art).
Chinese Office Action in related matter. CN201180048208.5, issued May 29, 2015 (new art).
Coban M et al.: "AMP mode support for minimum Cus of size greater than 8/8", 10. JCT-VC Meeting; 101. MPEG Meeting; Nov. 9, 2012; Stockholm; (Joint Collaborative Team on Video Coding of ISO/IEC JTC1/SC29/WG11 and ITU-TSG. 16):http://wftp3.itu.int/av-arch/jctvc-site/ No. JCTVC-J0278, Jul. 2, 2010, all pages.
ISR & Written Opinion, Re: Application # PCT/US2011/051993; Mar. 26, 2013.
ISR and Written Opinion for International Patent Application PCT/US2012/031441; dated Jun. 27, 2012.
Krit Panusopone et al., "Flexible Picture Partitioning", JCT-VC (Joint Collaborative Team on Video Coding) JCTVC-C260, Meeting, Oct. 7-Oct. 15, 2010.
Kim et al., "Coding efficiency improvement of HEVC using asymmetric motion partioning" Digital Media and communication research and Development center of Samsung Electronics Co., Ltd. Korea, Apr. 27, 2012.
Chinese Office Action in a related matter. Chinese Patent Application No. 201280003235.5, mailed Aug. 4, 2015 citing new art.
Chinese Office Action in CN201180047716.1,a related matter. Dated Dec. 2, 2015. (citing new art).
Bross B et al.: "WD4: Working Draft 4 of High-Efficiency Video Coding", 6. JCT-VC Meeting; 97, MPEG Meeting; Jul. 14, 2011-Jul. 22, 2011; Torino; (Joint Collaborative Team on Video Coding of ISO/IEC JTC1/SC29/WG11 and ITU-T SG. 16); URL:http://wftp3.itu.int/av-arch/jcivc-site/, No. JCTVC-F803, Sep. 8, 2011, all pages.

* cited by examiner

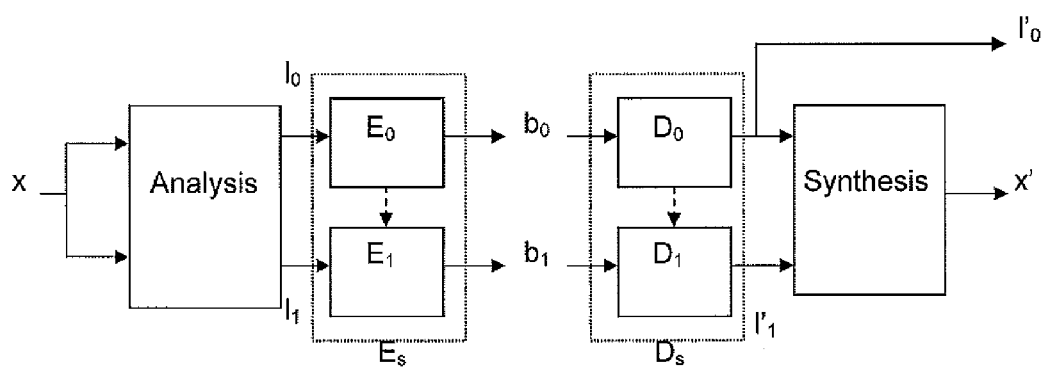
Figure 19. Example of the decomposition of an input x into two layers through analysis filtering

METHOD AND APPARATUS FOR SPATIAL SCALABILITY FOR VIDEO CODING

CROSS REFERENCE TO RELATED APPLICATIONS

This application is a continuation-in-part of U.S. application Ser. No. 13/253,793 filed on Oct. 5, 2011, which claims the benefit of U.S. Provisional Patent Application No. 61/389,930 filed on Oct. 5, 2010, now expired, and this application also claims priority to U.S. Provisional Patent Application No. 61/451,824 filed on Mar. 11, 2011, the disclosures of which are incorporated by reference into this patent application in their entirety.

FIELD OF THE INVENTION

This application relates to coding of video streams and, in particular, relates to a dividing the video streams according to the features found in the video stream and then using the appropriate coding method to encode the divided video stream.

BACKGROUND OF THE INVENTION

Many video compression techniques, e.g. MPEG-2 and MPEG-4 Part 10/AVC, use block-based motion compensated transform coding. These approaches attempt to adapt block size to content for spatial and temporal prediction, with DCT transform coding of the residual. Although efficient coding can be achieved, limitations on block size and blocking artifacts can often affect performance. What is needed is a framework that allows for coding of the video that can be better adapted to the local image content for efficient coding and improved visual perception.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 19 illustrates the decomposition of an input x into two layers through analysis filtering.

Figure 1:
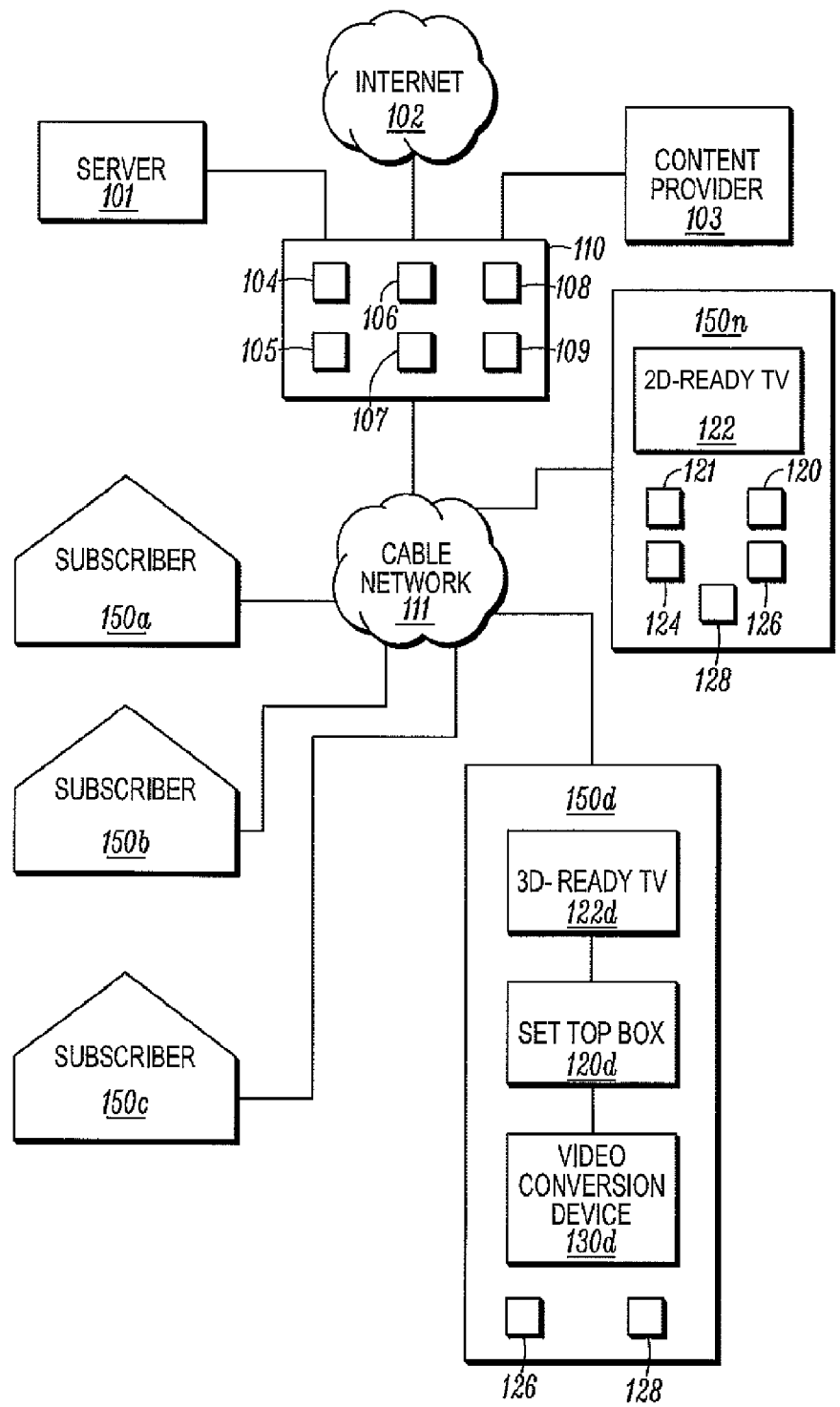
FIG. 1 is an example of a network architecture that is used by some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a method and apparatus of feature based coding of video streams. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. It will be appreciated that embodiments of the invention described herein may be comprised of one or more conventional processors and unique stored program instructions that control the one or more processors to implement, in conjunction with certain non-processor circuits, some, most, or all of the functions of feature base coding of video streams as described herein. The non-processor circuits may include, but are not limited to, a radio receiver, a radio transmitter, signal drivers, clock circuits, power source circuits, and user input devices. As such, these functions may be interpreted as steps of a method to perform feature based coding of video streams. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In accordance with the description, the principles described are directed to an apparatus operating at a head end of a video distribution system and a divider to segment an input video stream into partitions for each of a plurality of channels of the video. The apparatus also includes a channel analyzer coupled to the divider wherein the channel analyzer decomposes the partitions, and an encoder coupled to the channel analyzer to encode the decomposed partitions into an encoded bitstream wherein the encoder receives coding information from at least one of the plurality of channels to be used in encoding the decomposed partitions into the encoded bitstream. In an embodiment, the apparatus includes a reconstruction loop to decode the encoded bitstream and recombine the decoded bitstreams into a reconstructed video stream and a buffer to store the reconstructed video stream. In another embodiment, the buffer also can store other coding information from other channels of the video stream. In addition, the coding information includes at least one of the reconstructed video stream and coding information used for the encoder and the coding information is at least one of reference picture information and coding information of video stream. Moreover, the divider uses at least one of a plurality of feature sets to form the partitions. In an embodiment the reference picture information is determined from reconstructed video stream created from the bitstreams.

In another embodiment, an apparatus is disclosed that includes a decoder that receives an encoded bitstream wherein the decoder decodes the bitstream according to received coding information regarding channels of the encoded bitstream. The apparatus also includes a channel synthesizer coupled to the decoder to synthesize the decoded bitstream into partitions of a video stream, and a combiner coupled to the channel synthesizer to create a reconstructed video stream from the decoded bitstreams. The coding information can include at least one of the reconstructed video stream and coding information for the reconstructed video stream. In addition, the apparatus includes a buffer coupled to the combiner wherein the buffer stores the reconstructed video stream. A filter can couple between the buffer and decoder to feed back at least a part of the reconstructed video stream to the decoder as coding information. The partitions can also be determined based on at least one of a plurality of feature sets of the reconstructed video stream.

In addition, the principles described disclose a method that includes receiving an input video stream and partitioning the input video stream into a plurality of partitions. The method also includes decomposing the plurality of partitions, and encoding the decomposed partitions into an encoded bitstream wherein the encoding uses coding information from channels of the input video stream. In an embodiment, the method further includes receiving a reconstructed video stream derived from the encoded bitstreams as an input used to encode the partitions into the bitstream. Moreover, the method can include buffering a reconstructed video stream reconstructed from the encoded bitstreams to be used as coding information for other channels of the input video stream. The coding information can be at least one of reference picture information and coding information of the video stream.

Another method is also disclosed. This method includes receiving at least one encoded bitstream and decoding the received bitstream wherein the decoding uses coding information from channels of an input video stream. In addition, the method synthesizes the decoded bitstream into a series of partitions of the input video stream, and combines the partitions into a reconstructed video stream. In an embodiment, the coding information is at least one of reference picture information and coding information of the input video stream. Furthermore, the method can include using the reconstructed video stream as input for decoding the bitstreams and synthesizing the reconstructed video stream for decoding the bitstream.

The present description is developed based on the premise that each area of a picture in a video stream is most efficiently described with a specific set of features. For example, a set of features can be determined for the parameters that efficiently describes a face for a given face model. In addition, the efficiency of a set of features that describe a part of an image depends on the application (e.g. perceptual relevance for those applications where humans are the end user) and efficiency of the compression algorithm used in encoding for minimum description length of those features.

The proposed video codec uses N sets of features, named $\{FS_1 \ldots FS_N\}$, where each $FS_i$ consists of $n_i$ features named $\{f_i(1) \ldots f_i(n_i)\}$. The proposed video codec efficiently (e.g. based on some Rate-Distortion aware scheme) divides each picture into P suitable partitions that can be overlapped or disjoint. Next, each partition j is assigned one set of features which optimally describes that partition, e.g. $FS_i$. Finally the value associated with each of the $n_i$ features in the $FS_i$ feature set to describe the data in partition j is encoded/compressed and sent to the decoder. The decoder reconstructs each feature value and then reconstructs the partition. The plurality of partitions will form the reconstructed picture.

In an embodiment, a method is performed that receives a video stream that is to be encoded and transmitted or stored in a suitable medium. The video stream is comprised of a plurality of pictures that are arranged in a series. For each of the plurality of pictures, the method determines a set of features for the picture and divides each picture into a plurality of partitions. Each partition corresponds to at least one of the features that describe the partition. The method encodes each partition according to an encoding scheme that is adapted to the feature that describes the partition. The encoded partitions can then be transmitted or stored.

It can be appreciated that a suitable method of decoding is performed for a video stream that is received using feature based encoding. The method determines from the received video stream the encoded partitions. From each received partition it is determined from the encoding method used the feature used to encode each partition. Based on the determined features, the method reconstructs the plurality of partitions used to create each of the plurality of pictures in the encoded video stream.

In an embodiment, each feature coding scheme might be unique to that specific feature. In another embodiment, each feature coding scheme may be shared for coding of a number of different features. The coding schemes can use spatial, temporal or coding information across the feature space for the same partition to optimally code any given feature. If the decoder depends on such spatial, temporal or cross feature information, it must come from already transmitted and decoded data.

Turning to FIG. 1, there is illustrated a network architecture 100 that encodes and decodes a video stream according the features found in the pictures of the video stream. Embodiments of the encoding and decoding are described in more detail below. As shown in FIG. 1, the network architecture 100 is illustrated as cable television (CATV) network architecture 100, including a cable head end unit (or cable head end) 110 and a cable network 111. It is understood, however, that the concepts described here are applicable to other video streaming embodiments including other wired and wireless types of transmission. A number of data sources 101, 102, 103, may be communicatively coupled to the cable head end unit 110 including, but in no way limited to, a plurality of servers 101, the Internet 102, radio signals, or television signals received via a content provider 103. The cable head end 110 is also communicatively coupled to one or more subscribers 150a-n through a cable network 111.

The cable head end 110 includes the necessary equipment to encode the video stream that it receives from the data sources 101, 102, 103 according to the various embodiments described below. The cable head end 110 includes a feature set device 104. The feature set device 104 stores the various features, described below, that are used to partition the video stream. As features are determined, the qualities of the features are stored in the memory of the feature set device 104. The cable head end 110 also includes a divider 105 that divides the video stream into a plurality of partitions according the various features of the video stream determined by the feature set device 104.

The encoder 106 encodes the partitions using any of a variety of encoding schemes that are adapted to the features that describe the partitions. In an embodiment, the encoder is capable of encoding the video stream according to any of a variety of different encoding schemes. The encoded partitions of the video stream are provided to the cable network 111 and transmitted using transceiver 107 to the various subscriber units 150a-n. In addition, a processor 108 and memory 109 are used in conjunction with the feature set device 104, divider 105, encoder 106 and transceiver 107 as a part of the operation of cable head end 110.

The subscriber units 150a-n can be 2D-ready TVs 150n or 3D ready TVs 150d. In an embodiment, the cable network 111 provides the 3D and 2D video content stream to each of the subscriber units 150a-n using, for instance, fixed optical fibers or coaxial cables. The subscriber units 150a-n each include a set top box (STB) 120, 120d that receives the video content stream that is using the feature-based principles described. As is understood, the subscriber units 150a-n can include other types of wireless or wired transceivers from STB 120, 120d that are capable of transmitting and receiving video streams and control data from the cable head end 110. The subscriber unit 150d may have a 3D-ready TV component 122d capable of displaying 3D stereoscopic views. The subscriber unit 150n has a 2D TV component 122 that is capable of displaying 2D views. Each of the subscriber units 150a-n include includes a combiner 121 that receives the decoded partitions and recreates the video stream. In addition, a processor 126 and memory 128, as well as other components not shown, are used in conjunction with the STB and the TV components 122, 122d as part of the operation of the subscriber units 150a-n.

As mentioned, each picture in the video stream is partitioned according to the various features found in the pictures. In an embodiment, the rules by which a partition is decomposed or analyzed for encoding and reconstructed or synthesized for decoding are based on a set of fixed features that are known by both encoder and the decoder. These fixed rules are stored in the memories 109, 128 of the cable head end 110 and the subscriber units 150a-n, respectively. In this embodiment, there is no need to send any information from the encoder to the decoder on how to reconstruct the partition in this class of fixed feature-based video codecs. In this embodiment, the encoder 106 and the decoders 124 are configured with the feature sets used to encode/decode the various partitions of the video stream.

In another embodiment, the rules by which a partition is decomposed or analyzed for encoding and reconstructed or synthesized for decoding is based on a set of features that is set by the encoder 106 to accommodate more efficient coding of a given partition. The rules that are set by the encoder 106 are adaptive reconstruction rules. These rules need to be sent from the cable head end 110 to the decoder 124 at the subscriber units 150a-n.

Figure 2:
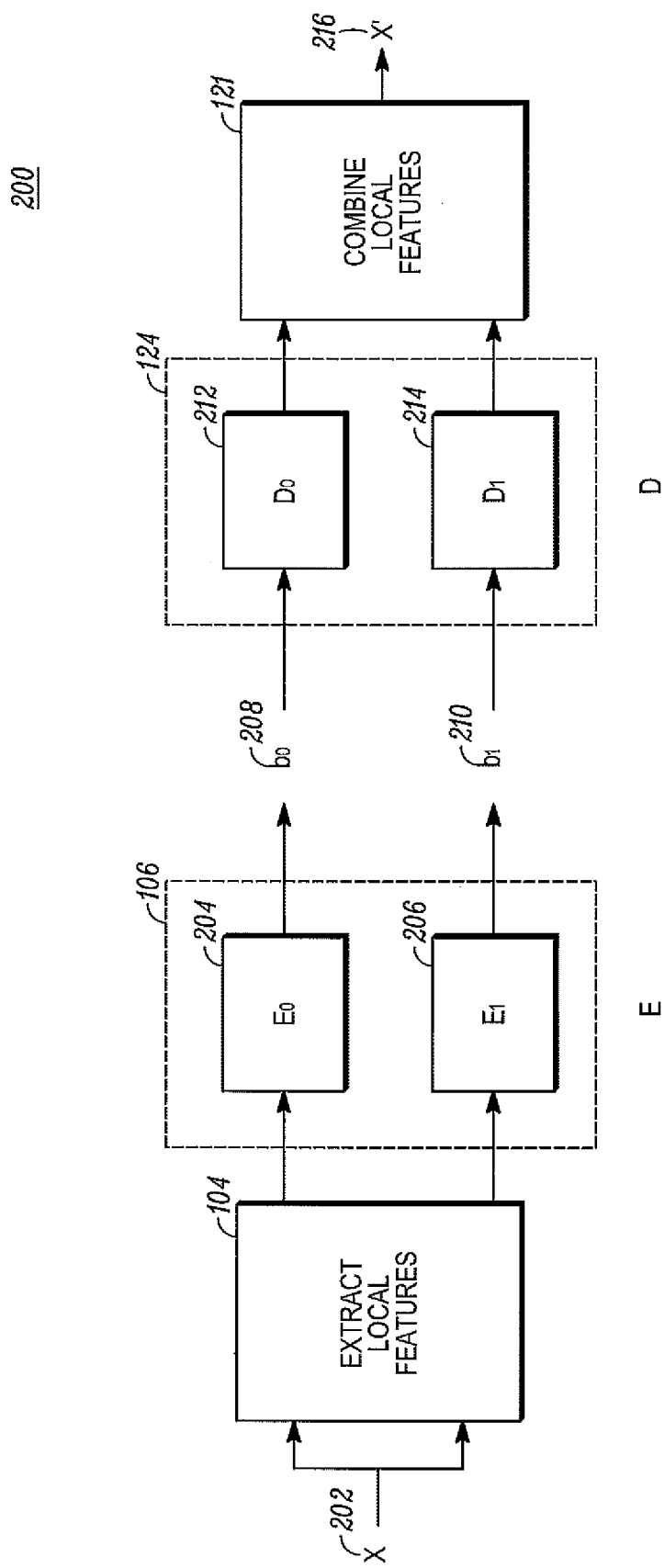
FIG. 2 is a diagram of an encoder/decoder used in accordance with some embodiments of the invention.

FIG. 2 shows a high-level diagram 200 where the input video signal x 202 is decomposed into two sets of features by a feature set device 104. The pixels from the input video x 202 can be categorized by features such as motion (e.g. low, high), intensity (bright, dark), texture, pattern, orientation, shape, and other categories based on the content, quality or context of the input video x 202. The input video signal x 202 can also be decomposed by spatiotemporal frequency, signal vs. noise, or by using some image model. In addition, the input video signal x 202 can be decomposed using a combination of any of the different categories. Since the perceptual importance of each feature can differ, each one can be more appropriately encoded by encoder 106 with one or more of the different encoders $E_i$ 204, 206 using different encoder parameters to produce bitstreams $b_i$ 208, 210. The encoder E 106 can also make joint use of the individual feature encoders $E_i$ 204, 206.

The decoder D 124, which includes decoder 212, 214, reconstructs the features from the bitstreams $b_i$ 208, 210 with possible joint use of information from all the bitstreams being sent between the cable head end 110 and the subscriber units 105a-n and the features are combined by combiner 121 to produce the reconstructed output video signal x' 216. As can be understood, output video signal x' 216 corresponds to the input video signal x 202.

Figure 3:
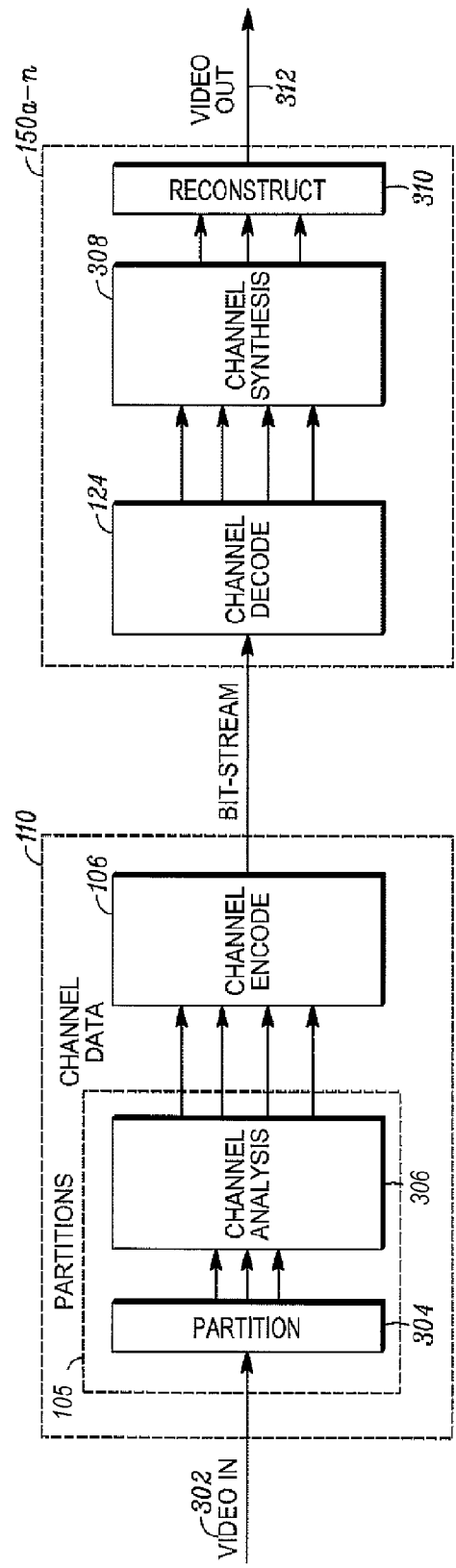
FIG. 3 is a diagram of an encoder/decoder used in accordance with some embodiments of the invention.

More specifically, FIG. 3 shows a diagram of the proposed High-Efficiency Video Coding (HVC) approach. For example, the features used as a part of HVC are based on a spatial frequency decomposition. It is understood, however, that the principles described for HVC can be applied to features other than spatial frequency decomposition. As shown, an input video signal x 302 is provided to the divider 105, which includes a partitioning module 304 and a channel analysis module 306. The partitioning module 304 is configured to analyze the input video signal x 302 according to a given feature set, e.g. spatial frequency, and divide or partition the input video signal x 302 into a plurality of partitions based on the feature set. The partitioning of the input video signal x 302 is based on the rules corresponding to the given feature set. For example, since the spatial frequency content varies within a picture, each input picture is partitioned by partitioning module 304 so that each partition can have a different spatial frequency decomposition so that each partition has a different feature set.

For example, in the channel analysis module 306, an input video partition can be decomposed into 2×2 bands based on spatial frequency, e.g. low-low, low-high, high-low, and high-high for a total of four feature sets, or into 2×1

(vertical) or 1×2 (horizontal) frequency bands that require two features (H & L frequency components) for these two feature sets. These sub-bands or "channels" can be coded using spatial prediction, temporal prediction, and cross-band prediction, with an appropriate sub-band specific objective or perceptual quality metric (e.g. mean square error (MSE) weighting). Existing codec technology can be used or adapted to code the bands using channel encoder 106. The resulting bitstream of the encoded video signal partitions is transmitted to subscriber units 150a-n for decoding. The channels decoded by decoder 124 are used for channel synthesis by module 308 to reconstruct the partitions by module 310 that thereby produce output video signal 312.

Figure 4:
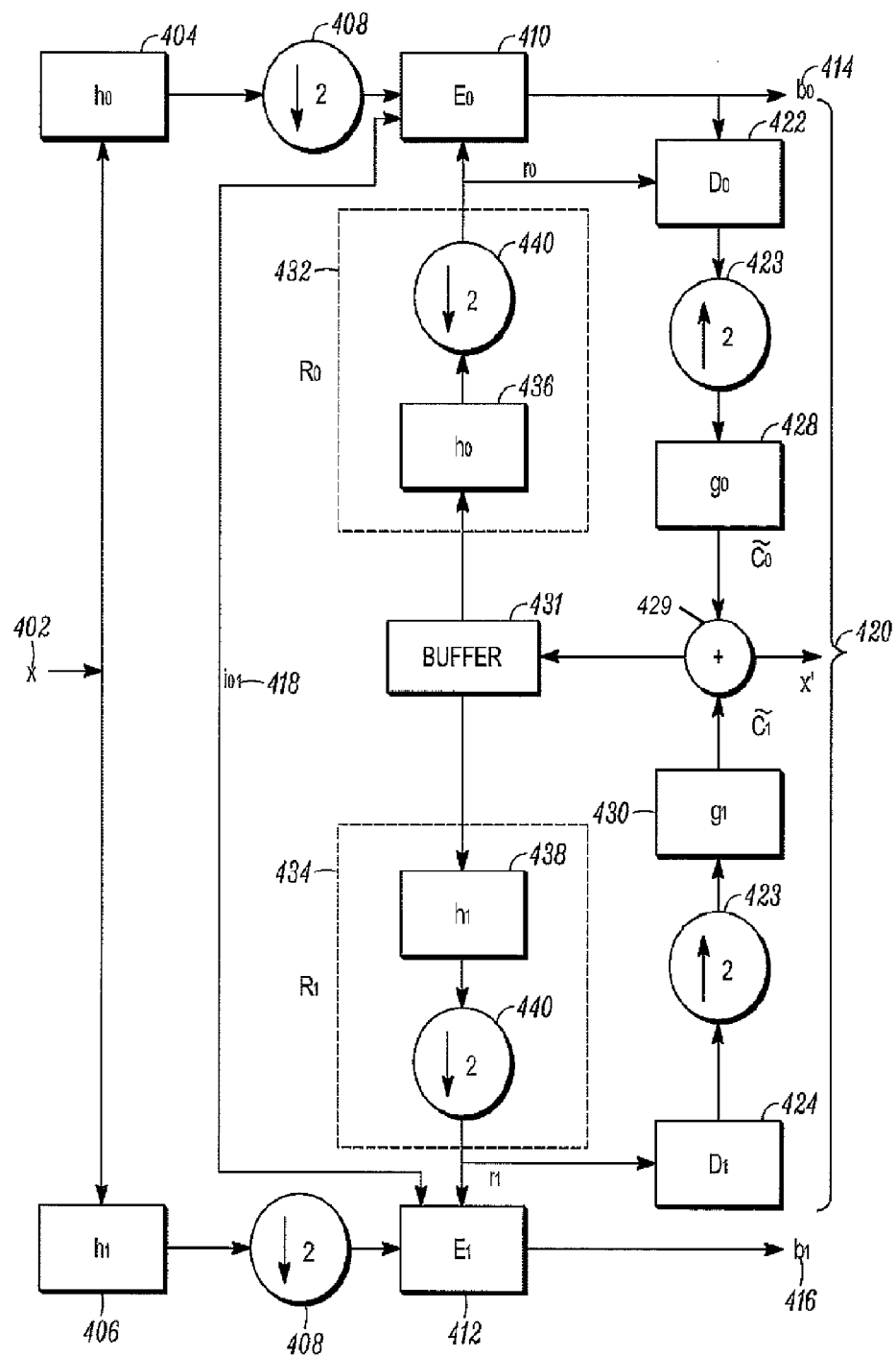
FIG. 4 is an illustration of an encoder incorporating some of the principles of the invention.

An example of a two-channel HVC encoder 400 is shown in FIG. 4. The input video signal x 402 can be the entire image or a single image partition from divider 105. The input video signal x 402 is filtered according to a function $h_i$ by filters 404, 406. It is understood that any number of filters can be used depending on the features set. In an embodiment, filtered signals are then sampled by sampler 408 by a factor corresponding to the number of filters 404, 406, e.g. two, so that the total number of samples in all channels is the same as the number of input samples. The input image or partition can be appropriately padded (e.g. using symmetric extension) in order to achieve the appropriate number of samples in each channel. The resulting channel data is then encoded by encoder $E_0$ 410 and $E_1$ 412 to produce the channel bitstream $b_0$ 414 and $b_1$ 416, respectively.

If the bit depth resolution of the input data to an encoder $E_i$ is larger than what the encoder can process, then the input data can be appropriately re-scaled prior to encoding. This re-scaling can be done through bounded quantization (uniform or non-uniform) of data which may include scaling, offset, rounding and clipping of the data. Any operations performed before encoding (such as scaling and offset) should be reversed after decoding. The particular parameters used in the transformation can be transmitted to the decoder or agreed upon a priori between the encoder and decoder.

A channel encoder may make use of coding information $i_{01}$ 418 from other channels (channel k for channel j in the case of $i_{jk}$) to improve coding efficiency and performance. If $i_{01}$ is already available at the decoder there is no need to include this information in the bitstream this information; otherwise, $i_{01}$ is also made available to the decoder, described below, with the bitstreams. In an embodiment, the coding information $i_{jk}$ can be the information needed by the encoders or decoders or it can be predictive information based on analysis of the information and the channel conditions. The reuse of spatial or temporal prediction information can be across a plurality of sub-bands determined by the HVC coding approach. Motion vectors from the channels can be made available to the encoders and decoders so that the coding of one sub-band can be used by another sub-band. These motion vectors can be the exact motion vector of the sub-band or predictive motion vectors. Any currently coded coding unit can inherit the coding mode information from one or more of the sub-bands which are available to the encoders and decoders. In addition, the encoders and decoders can use the coding mode information to predict the coding mode for the current coding unit. Thus, the modes of one sub-band can also be used by another sub-band.

In order to match the decoded output, the decoder reconstruction loop 420 is also included in the encoder, as illustrated by the bitstream decoder $D_i$ 422, 424. As a part of the decoder reconstruction loop 420, the decoded bitstreams 414, 416 are up-sampled by a factor of two by samplers 423, where the factor corresponds to the number of bitstreams, and is then post-filtered by a function of gi by filters 428, 430. The filters $h_i$ 404, 406 and filters $g_i$ 428, 430 can be chosen so that when the post-filtered outputs are added by combiner 429, the original input signal x can be recovered as reconstructed signal x' in the absence of coding distortion. Alternatively, the filters $h_i$ 404, 406 and $g_i$ 428, 430 can be designed so as to minimize overall distortion in the presence of coding distortion.

FIG. 4 also illustrates how the reconstructed output x' can be used as a reference for coding future pictures as well as for coding information i for another channel k (not shown). A buffer 431 stores these outputs, which then can be filtered $h_i$ and decimated to produce picture $r_i$, and this is performed for both encoder $E_i$ and decoder $D_i$. As shown, the picture $r_i$ can be fed back to be used by both the encoder 410 as well as the decoder 422, which is a part of the reconstruction loop 420. In addition, optimization can be achieved using filters $R_i$ 432, 434, which filter and sample the output for the decoder reconstruction loop 420 using a filter function h 436, 438 and samplers 440. In an embodiment, the filters $R_i$ 432, 434 select one of several channel analyses (including the default with no decomposition) for each image or partition. However, once an image or partition is reconstructed, the buffered output can then be filtered using all possible channel analyses to produce appropriate reference pictures. As is understood, these reference pictures can be used as a part of the encoders 410, 412 and as coding information for other channels. In addition, although FIG. 4 shows the reference channels being decimated after filtering, it is also possible for the reference channels to be undecimated. While FIG. 4 shows the case of a two-channel analysis, the extension to more channels is readily understood from the principles described.

Sub-band reference picture interpolation can be used to provide information on what the video stream should be. The reconstructed image can be appropriately decomposed to generate reference sub-band information. The generation of sub-sampled sub-band reference data can be done using an undecimated reference picture that may have been properly synthesized. A design of a fixed interpolation filter can be used based on the spectral characteristics of each sub-band. For example, a flat interpolation is appropriate for high frequency data. On the other hand, adaptive interpolation filters can be based on MSE minimization that may include Wiener filter coefficients that apply to synthesized referenced frames that are undecimated.

Figure 5:
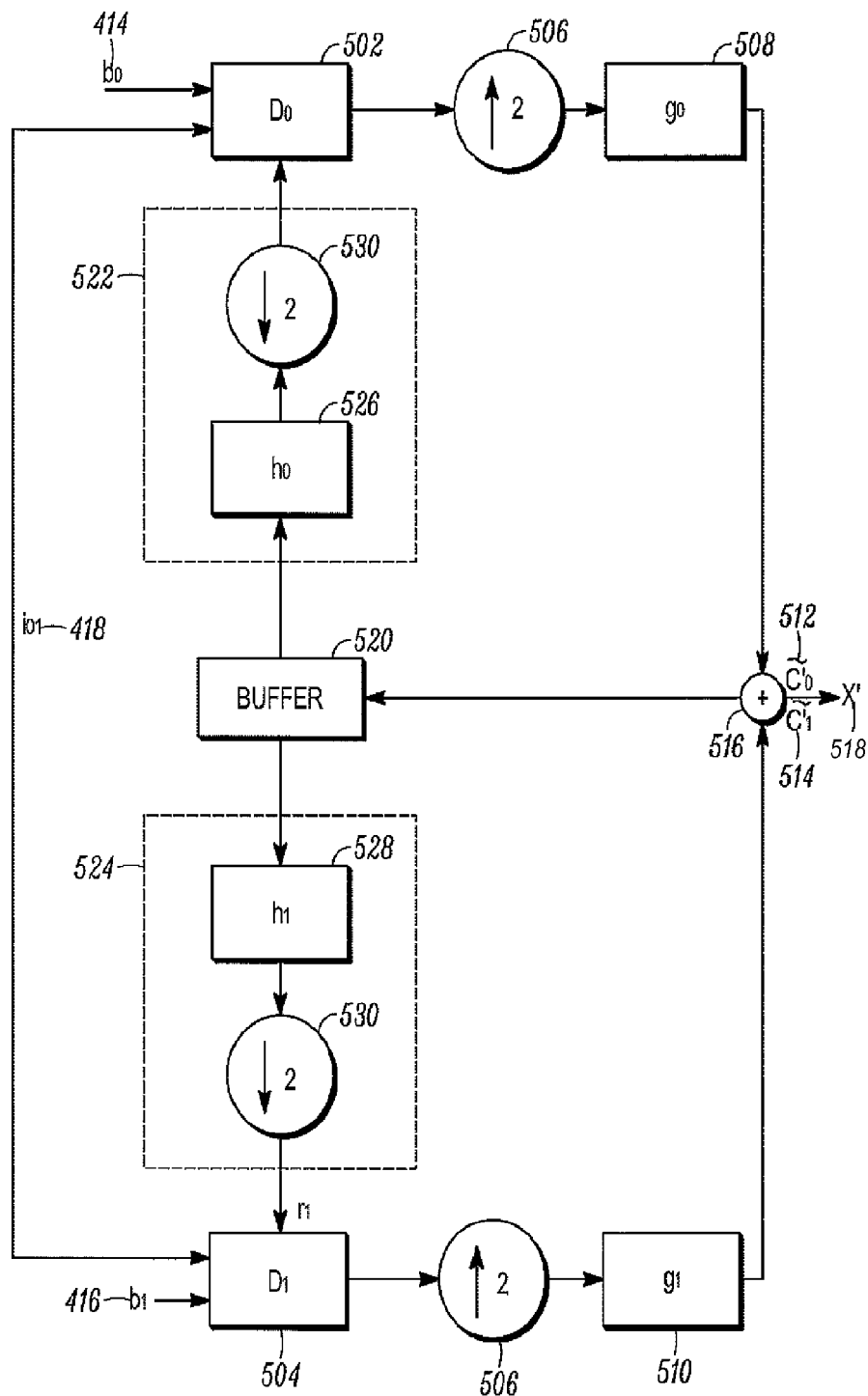
FIG. 5 is an illustration of a decoder corresponding to the encoder shown in FIG. 4.

FIG. 5 shows the corresponding decoder 500 to the encoder illustrated in FIG. 4. The decoder 500 operates on the received bitstreams $b_i$ 414, 416 and co-channel coding information i 418. This information can be used to derive or re-use coding information among the channels at both the encoder and decoder. The received bitstreams 414, 416 are decoded by decoders 502, 504 which are configured to match the encoders 410, 412. When encoding/decoding parameters are agreed to a priori, then decoders 502, 504 are configured with similar parameters. Alternatively, decoders 502, 504 receive parameter data as a part of the bitstreams 414, 416 so as to be configured corresponding to the encoders 410, 412. Samplers 506 are used to resample the decoded signal. Filters 508, 510 using a filter function $g_i$ are used to obtain a reconstructed input video signal x'. Specifically, the output signals $\tilde{c}_0$ 512 and $\tilde{c}_1$ 514 from filters 508, 510 are added together by adder 516 to produce reconstructed input video signal x' 518.

As seen, the reconstructed video signal x' 518 is also provided to buffer 520. The buffered signal is supplied to filters 522, 524 that filter the reconstructed input signal by a function of $h_i$ 526, 528 and then resamples the signals using sampler 530. As shown, the filtered reconstruction input signal is fed back into decoders 502, 504.

Figure 6:
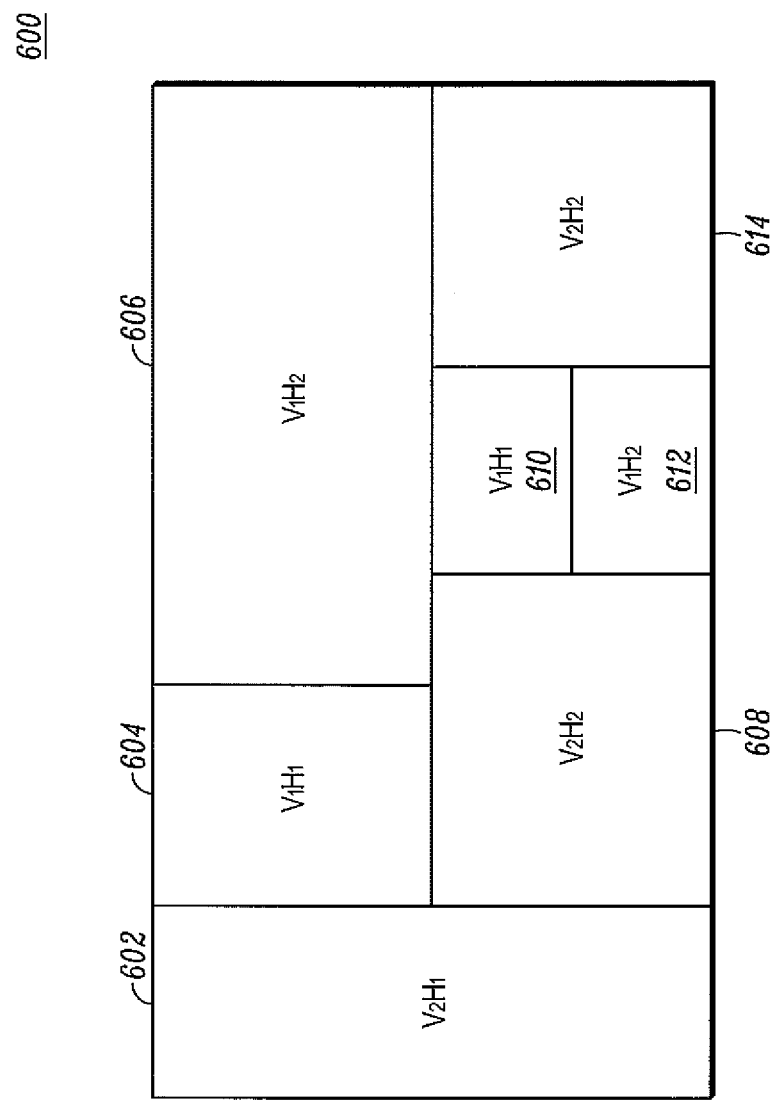
FIG. 6 is an illustration of a partitioned picture from a video stream in accordance with some embodiments of the invention.

As described above, an input video stream x can be divided into partitions by divider 105. In an embodiment, the pictures of an input video stream x are divided into partitions where each partition is decomposed using the most suitable set of analysis, sub-sampling, and synthesis filters (based on the local picture content for each given partition) where the partitions are configured having similar features from the feature set. FIG. 6 shows an example of a coding scenario which uses a total of four different decomposition choices using spatial frequency decomposition as an example of the feature set used to adaptively partition, decompose and encode a picture 600. Adaptive partitioning of pictures in a video stream can be described by one feature set FS that is based on a minimal feature description length criterion. As understood, other feature sets can be used. For spatial frequency decomposition, the picture 600 is examined to determine the different partitions where similar characteristics can be found. Based on the examination of the picture 600, partitions 602-614 are created. As shown, the partitions 602-614 are not overlapping with one another, but it is understood that the edges of partitions 602-614 can overlap.

In the example of spatial frequency decomposition, the feature set options are as based on vertical or horizontal filtering and sub-sampling. In one example, designated as $V_1H_1$, used in partitions 604, 610 as an example, the pixel values of the partition are coded. This feature set has only one feature, which are the pixel values of the partition. This is equivalent of the traditional picture coding, where the encoder and decoder operate on the pixel values. As shown, partitions 606, 612, which are designated by $V_1H_2$, are horizontally filtered and sub-sampled by a factor of two for each of the two sub-bands. This feature set has two features. One is the value(s) of the low frequency sub-band and the other is the value(s) of the high frequency sub-band. Each sub-band is then coded with an appropriate encoder. In addition, partition 602, which is designated by $V_2H_1$, is filtered using a vertical filter and sub-sampled by a factor of two for each of the two sub-bands. Like partitions 606, 612 using $V_1H_2$, the feature set for partition 602 has two features. One is the value(s) of the low frequency sub-band and the other is the value(s) of the high frequency sub-band. Each sub-band can be coded with an appropriate encoder.

Partitions 608, 614, which are designated by $V_2H_2$, use separable or non-separable filtering and sub-sampling by a factor of two in each of the horizontal and vertical directions. As the filtering and sub-sampling is in two dimensions, the operation takes place for each of four sub-bands so that the feature set has four features. For example, in the case of a separable decomposition, the first feature captures the value(s) of a low frequencies (LL) sub-band, the second and third features capture the combination of low and high frequencies, i.e. LH and HL sub-band value(s), respectively, and the fourth feature captures the value(s) of high frequencies (HH) sub-band. Each sub-band is then coded with an appropriate encoder.

Divider 105 can use a number of different adaptive partitioning schemes to approach creating the partitions 602-614 of each picture in a input video stream x. One category is rate distortion (RD) based. One example of RD based partition is a Tree-structured approach. In this approach, a partitioning map would be coded using a tree structure, e.g. quadtree. The tree branching is decided based on cost minimization that includes both the performance of the best decompositioning scheme as well as the required bits for description of the tree nodes and leaves. Alternatively, the RD based partition can use a two pass approach. In the first pass, all partitions with a given size would go through adaptive decompositioning to find the cost of each decompositioning choice, then the partitions from the first pass would be optimally merged to minimize the overall cost of coding the picture. In this calculation, the cost of transmission of the partitioning information can also be considered. In the second pass the picture would be partitioned and decomposed according to the optimal partition map.

Another category of partition is non-RD based. In this approach Norm-p Minimization is utilized. In this method, a norm-p of the sub-band data for all channels of the same spatial locality would be calculated for each possible choice of decompositioning. Optimal partitioning is realized by optimal division of the picture to minimize the over norm-p at all partitions 602-614. Also in this method, the cost of sending the partitioning information is considered by adding the suitably weighted bit-rate (either actual or estimated) to send the partitioning information to the overall norm-p of the data. For pictures with natural content a norm-1 is mostly used.

The adaptive sub-band decomposition of a picture or partition in video coding is described above. Each decomposition choice is described by the level of sub-sampling in each of horizontal and vertical directions, which in turn defines the number and size of sub-bands. e.g. $V_1H_1$, $V_1H_2$, etc. As understood, the decomposition information for a picture or partition can be reused or predicted by sending the residual increment for a future picture or partition. Each sub-band is derived by application of analysis filters, e.g. filters $h_i$ 404, 406, before compression and reconstructed by application of a synthesis filters, e.g. filters $g_i$ 428, 430, after proper upsampling. In the case of cascading the decomposition, there might be more than one filter involved to analyze or synthesize each band.

Returning to FIGS. 4 and 5, filters 404, 406, 428, 430, 436, 438, 508, 510, 526, 528 can be configured and designed to minimize the overall distortion and as adaptive synthesis filters (ASF). In ASF, filters are attempting to minimize the distortion caused by the coding of each channel. The coefficients of the synthesis filter can be set based on the reconstructed channels. On example of ASF is based on joint sub-band optimization. For a given size of the function of $g_i$, the Linear Mean Square Estimation technique can be used to calculate the coefficients of $g_i$ such that the mean square estimate error between the final reconstructed partition x' and the original pixels in the original signal x in the partition is minimized. In an alternative embodiment, independent channel optimization is used. In this example, the joint sub-band optimization requires the auto and cross correlations between the original signal x and the reconstructed sub-band signals after upsampling. Furthermore, a system of matrix equations can be solved. The computation associated with this joint sub-band optimization might be prohibitive in many applications.

Figure 7:
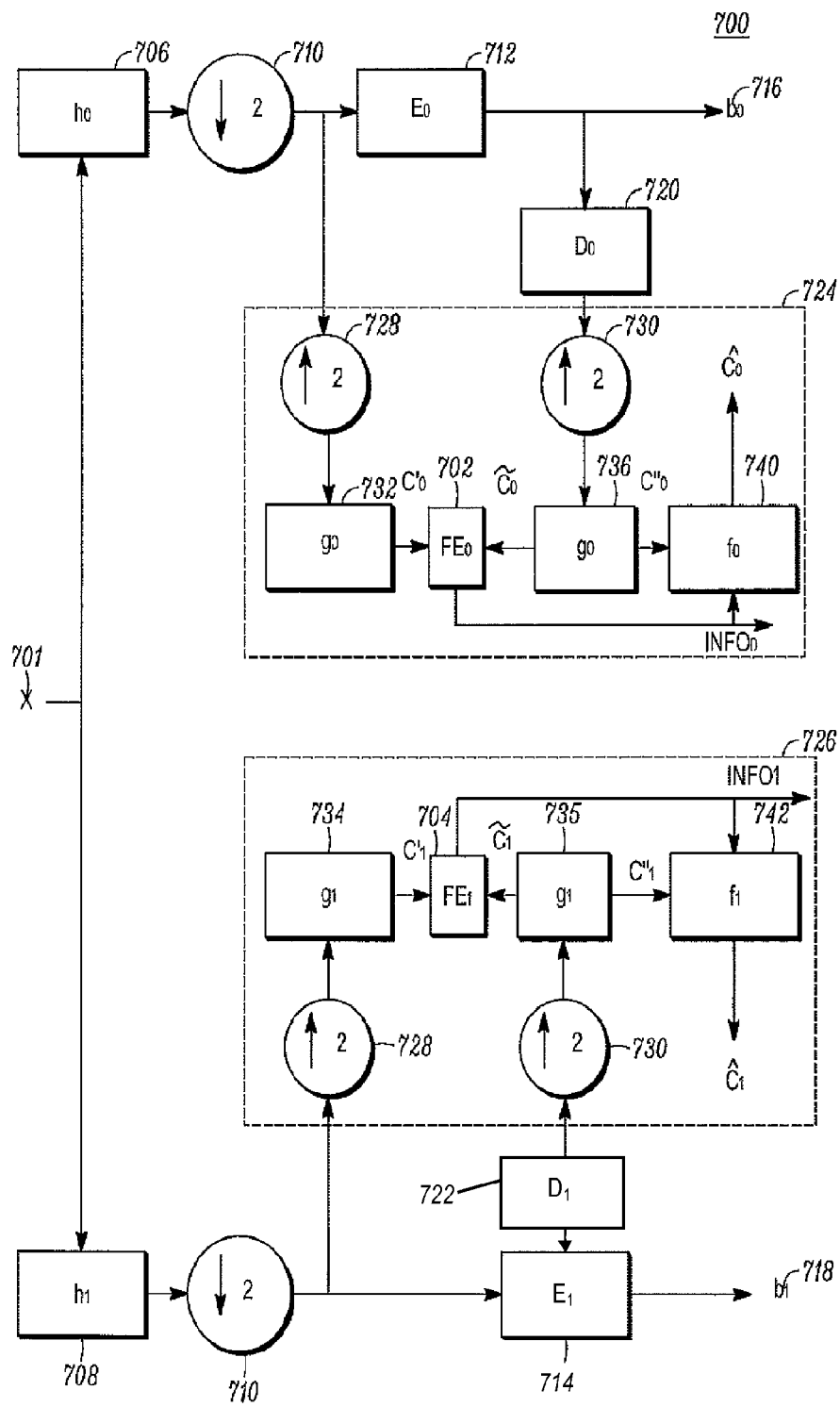
FIG. 7 is an illustration of an encoder incorporating some of the principles of the invention.

An example of independent channel optimization solution for an encoder 700 can be seen in FIG. 7, which focuses on the ASF so the reference picture processing using filters 432 and 434 shown in FIG. 3 are omitted. In ASF, filter estimation module (FE) 702, 704 is provided to perform filter estimation between the decoded reconstructed channel $\tilde{c}_i$, which is generally noisy, and the unencoded reconstructed channel $c'_i$, which is noiseless. As shown, an input video signal x 701 is split and provided to filters 706, 708 that filter the signal x according to the known function $h_i$ and then sampled using samplers 710 at a rate determined by the number of partitions. In an embodiment of two channel decomposition, one of the filters 706, 708 can be a low pass filter and the other can be high pass filters. It is understood, the partitioning the data in a two-channel decomposition doubles the data. Thus, the samplers 710 can critically sample the input signals to half the amount of data so that the same number of samples are available to reconstruct the input signal at the decoder. The filtered and sampled signal is then encoded by encoders $E_i$ 712, 714 to produce bitstreams $b_i$ 716, 718. The encoded bitstreams $b_i$ 716, 718 are provided to decoders 720, 722.

Encoder 700 is provided with an interpolation module 724, 726 that receives a signal filtered and sampled signal provided to the encoders 712, 714 and from decoder 720, 722. The decimated and sampled signal and the decoded signal are sampled by samplers 728, 730. The resampled signals are processed by filters 732, 734 to produce signal $c'_i$ while the decoded signals are also processed by filters 736, 738 to produce signal $\tilde{c}_i$. The signals $c'_i$ and $\tilde{c}_i$ are both provided to the filter estimation module 702, 704 described above. The output of the filter estimation module 702, 704 corresponds to the filter information $info_i$ of the interpolation module 724, 726. The filter information $info_i$ can also be provided to the corresponding decoder as well as to other encoders.

The interpolation module can also be configured with a filter 740, 742 utilizing a filter function $f_i$. The filter 740, 742 can be derived to minimize an error metric between $c'_i$ and $\tilde{c}_i$, and this filter is applied to $c''_i$ to generate $\hat{c}_i$. The resulting filtered channel outputs $\hat{c}_i$ are then combined to produce the overall output. In an embodiment, the ASF outputs $\hat{c}_i$ can be used to replace $\tilde{c}_i$ in FIG. 4. Since the ASF is applied to each channel before combining, the ASF filtered outputs $c_i$ can be kept at a higher bit-depth resolution relative to the final output bit-depth resolution. That is, the combined ASF outputs can be kept at a higher bit-depth resolution internally for purposes of reference picture processing, while the final output bit-depth resolution can be reduced, for example, by clipping and rounding. The filtering performed by the interpolation module 740, 742 can fill in information that may be discarded by the sampling conducted by samplers 710. In an embodiment, the encoders 712, 714 can use different parameters based on the features set used to partition the input video signals and then to encode signals.

Figure 8:
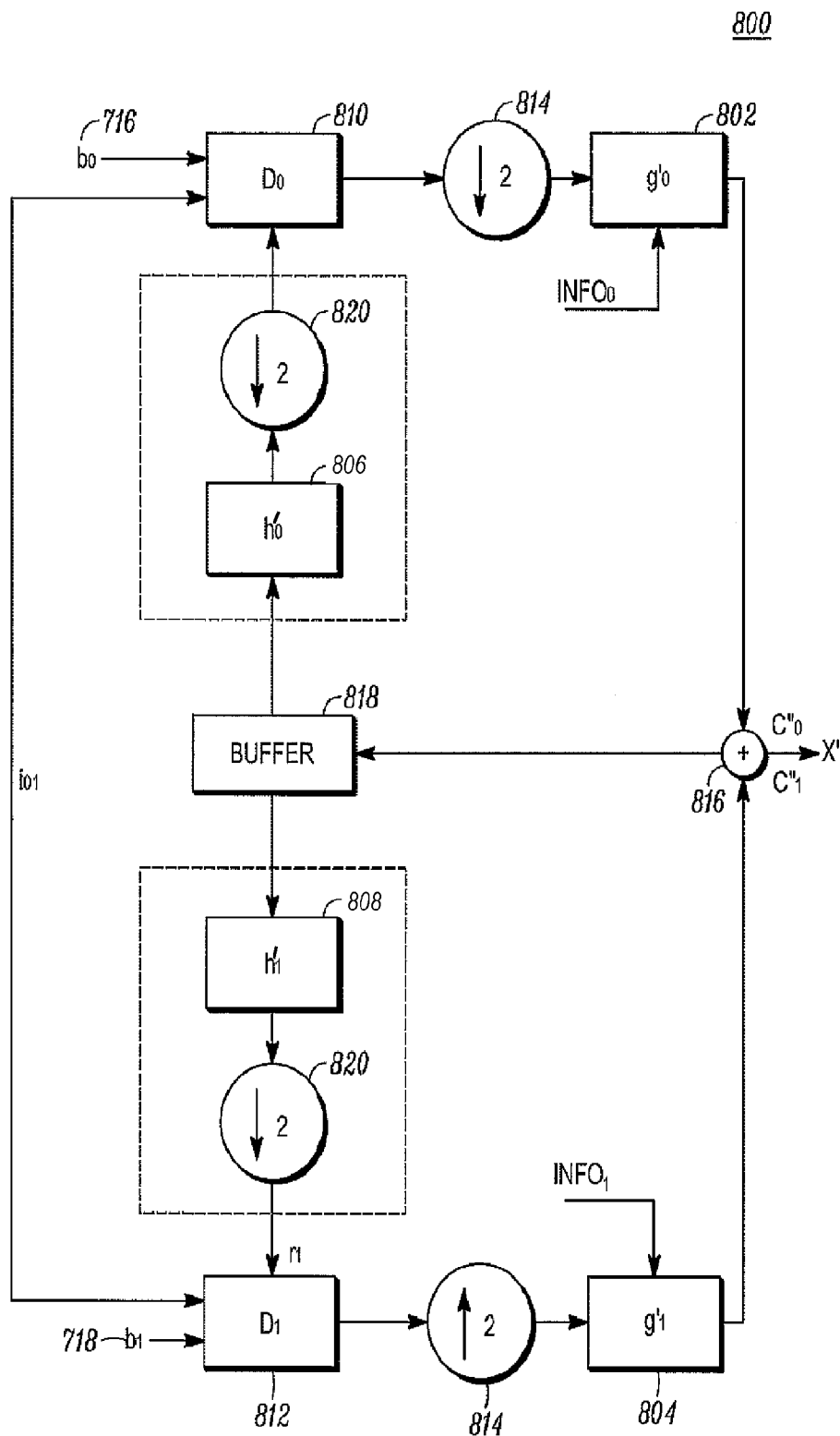
FIG. 8 is an illustration of a decoder corresponding to the encoder shown in FIG. 7.

The filter information $info_i$ or $i_i$ can be transmitted to the decoder 800, which is shown in FIG. 8. The modified synthesis filter 802, 804 $g_i'$ can be derived from the functions gi and fi of filters 706, 708, 732-742 so that both encoder 700 and decoder 800 perform equivalent filtering. In ASF, the synthesis filter 732-738 $g_i$ is modified to $g'_i$ in filters 802, 804 to account for the distortions introduced by the coding. It is also possible to modify the analysis filter functions hi from filters 706, 708 to hi' in filters 806, 808 to account for coding distortions in adaptive analysis filtering (AAF). Simultaneous AAF and ASF is also possible. ASF/AAF can be applied to the entire picture or to picture partitions, and a different filter can be applied to different partitions. In an example of AAF, the analysis filter, e.g. 9/7, 3/5, etc., can be selected from a set of filter banks. The filter that is used is based on the qualities of the signal coming into the filter. The coefficients of the AAF filter can be set based on the content of each partition and coding condition. In addition, the filters can be used for generation of sub-band reference data, in case the filter index or coefficients can be transmitted to the decoder to prevent a drift between the encoder and the decoder.

As seen in FIG. 8, bitstreams bi 716, 718 are supplied to decoders 810, 812, which have complementary parameters to encoders 712, 714. Decoders 810, 812 also receive as inputs coding information $i_i$ from the encoder 700 as well as from other encoders and decoders in the system. The output of decoders 810, 812 are resampled by samplers 814 and supplied to the filters 802, 804 described above. The filtered decoded bitstreams $c_i''$ are combined by the combiner 816 to produce reconstructed video signal x'. The reconstructed video signal x' can also be buffered in buffer 818 and processed by filters 806, 808 and sampled by samplers 820 to be supplied as feedback input to the decoders 810, 812.

The codecs shown in FIGS. 4-5 and 7-8 can be enhanced for HVC. In an embodiment, cross sub-band prediction can be used. For coding a partition with multiple sub-band feature sets, the encoder and the decoder can use the coding information from all the sub-bands that are already decoded and available at the decoder without the need to send any extra information. This is shown by the input of coding information $i_i$ provided to the encoders and decoders. An example of this is the re-use of temporal and spatial predictive information for the co-located sub-bands which are already decoded at the decoder. The issue of cross band prediction is an issue related to the encoder and the decoder. A few schemes which can be used to perform this task in the context of contemporary video encoders and decoders are now described.

One such scheme uses cross sub-band motion vector prediction. Since the motion vectors in corresponding locations in each of the sub-bands point to the same area in the pixel domain of the input video signal x and therefore for the various partitions of x, it is beneficial to use the motion vectors from already coded sub-bands blocks at the corresponding location to derive the motion vector for current block. Two extra modes can be added to the codec to support this feature. One mode is the re-use of motion vectors. In this mode the motion vector used for each block is directly derived from all the motion vectors of the corresponding blocks in the already transmitted sub-bands. Another mode uses motion vector prediction. In this mode the motion vector used for each block is directly derived by adding a delta motion vector to the predicted motion vector from all the motion vectors of the corresponding blocks in the already transmitted sub-bands.

Another scheme uses cross sub-band coding mode prediction. Since the structural gradients such as edges in each image location taken from a picture in the video stream or from a partition of the picture can be spilled to corresponding locations in each of the sub-bands, it is beneficial for coding of any given block to re-use the coding mode information from the already coded sub-band blocks at the corresponding location. For example, in this mode the prediction mode for each macroblock can be derived from the corresponding macroblock of the low frequency sub-band.

Another embodiment of codec enhancement uses reference picture interpolation. For purposes of reference picture processing, the reconstructed pictures are buffered as seen in FIGS. 4 and 5 and are used as references for coding of future pictures. Since the encoder $E_i$ operates on the filtered/decimated channels, the reference pictures are likewise filtered and decimated by reference picture process $R_i$ performed by filters 432, 434. However, some encoders may use higher subpixel precision and the function $R_i$ is typically interpolated as shown in FIGS. 9A and 9B for the case of quarter-pel resolution.

Figure 9A:
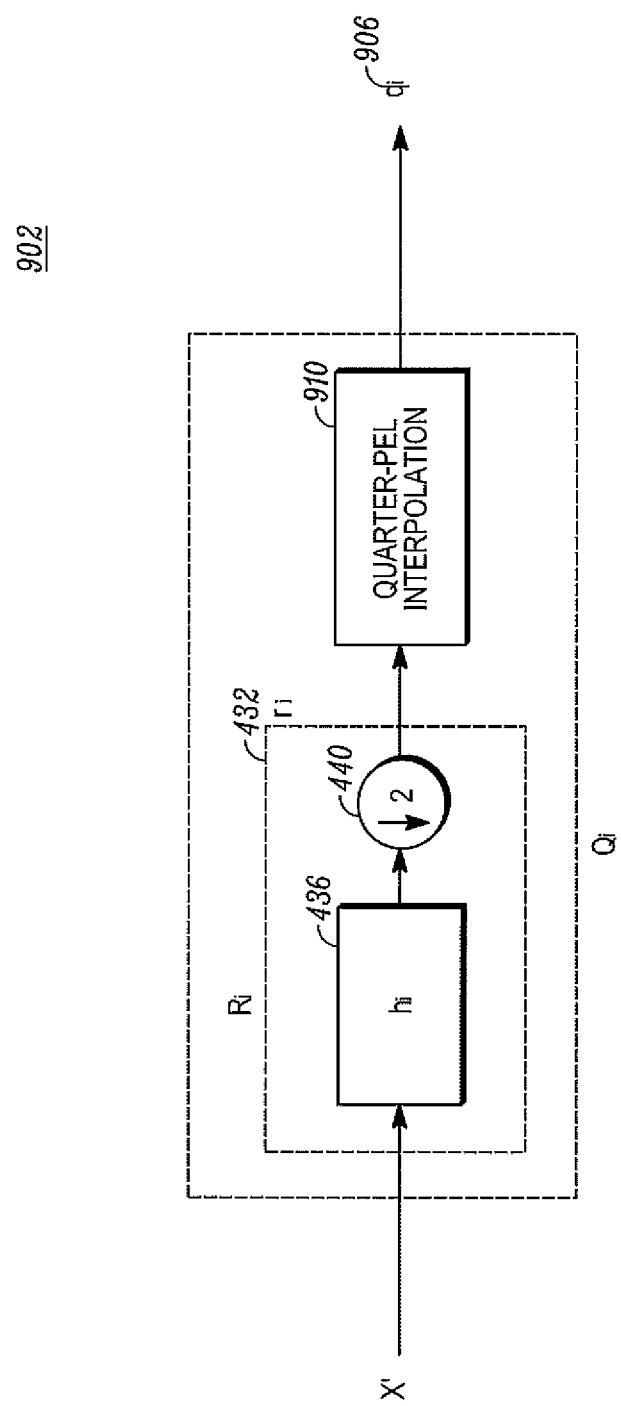
FIGS. 9(a) and 9(b) are illustrations of interpolation modules incorporating some of the principles of the invention.
Figure 9B:
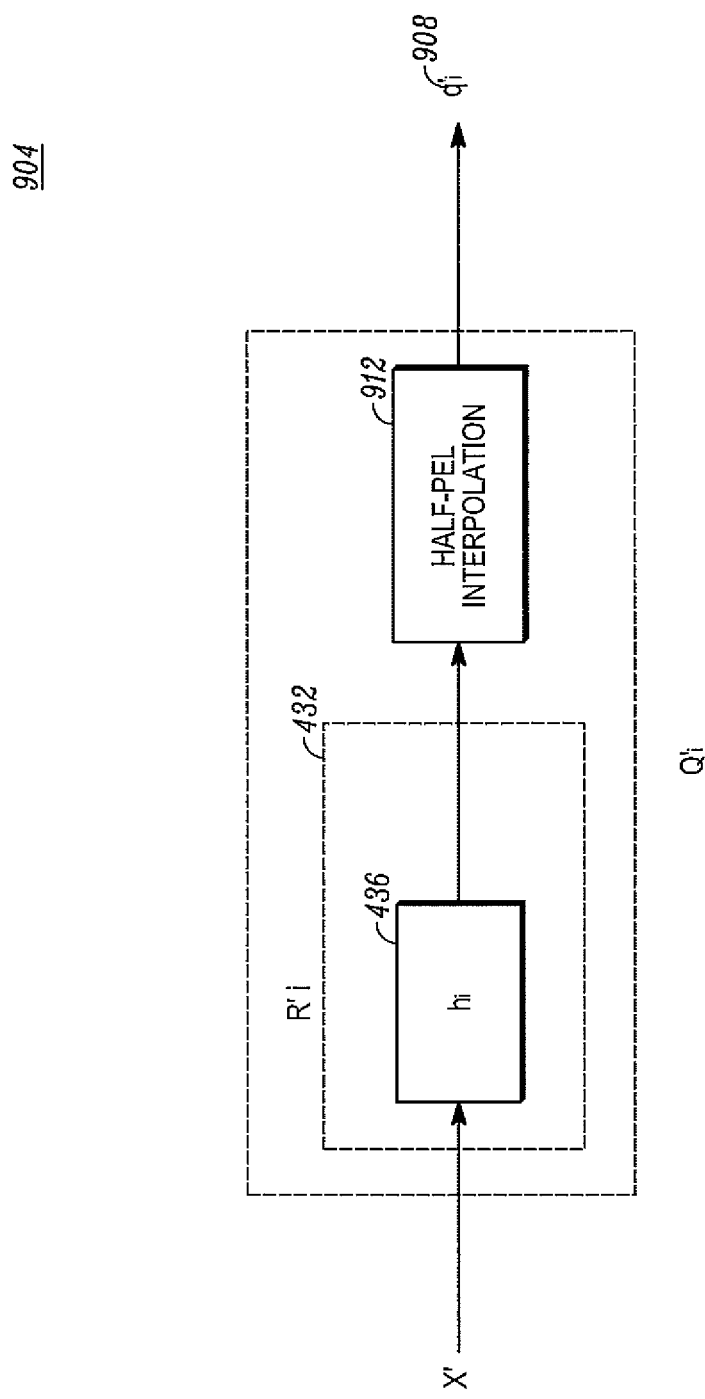

In FIGS. 9A and 9B, the reconstructed input signals x' are provided to the filter $Q_i$ 902 and $Q'_i$, 904. As seen in FIG. 9A, the reference picture processing operation by filter Ri 432 operation uses filter $h_i$ 436 and decimates the signal using sampler 440. The interpolation operation typically performed in the encoder can be combined in the filter's $Q_i$ 902 operation using quarter-pel interpolation module 910. This overall operation generates quarter-pel resolution reference samples qi 906 of the encoder channel inputs. Alternatively, another way to generate the interpolated reference picture $q_i'$ is shown in FIG. 9B. In this "undecimated interpolation" $Q_i'$, the reconstructed output is only filtered in $R_i'$ using filter $h_i$ 436 and not decimated. The filtered output is then interpolated by half-pel using half-pel interpolation module 912 to generate the quarter-pel reference picture $q_i'$ 908. The advantage of $Q_i'$ over $Q_i$ is that $Q_i'$ has access to the "original" (undecimated) half pel samples, resulting in better half-pel and quarter-pel sample values. The $Q_i'$ interpolation can be adapted to the specific characteristics of each channel i, and it can also be extended to any desired subpixel resolution.

As is understood from the foregoing, each picture, which in series makes up the input video stream x, can be processed as an entire picture, or partitioned into smaller contiguous or overlapping sub-pictures as seen in FIG. 5. The partitions can have fixed or adaptive size and shape. The partitions can be done at the picture level or adaptively. In an adaptive embodiments, the picture can be segmented into partitions using any of a number of different methods include a tree structure or a two-pass structure where the first path uses fixed blocks and the second pass works on merging blocks.

In decomposition, the channel analysis and synthesis can be chosen depending on content of the picture and video stream. For the example of filter-based analysis and synthesis, the decomposition can take on any number of horizontal and/or vertical bands, as well as multiple levels of decomposition. The analysis/synthesis filters can be separable or non-separable, and they can be designed to achieve perfect reconstruction in the lossless coding case. Alternatively, for the lossy coding case, they can be jointly designed to minimize the overall end-to-end error or perceptual error. As with the partitioning, each picture or sub-picture can have a different decomposition. Examples of such decomposition of the picture or video stream are filter-based, feature-based, content based such as vertical, horizontal, diagonal, features, multiple levels, separable and non-separable, perfect reconstruction (PR) or not PR, and picture and sub-picture adaptive methods.

For coding by the encoders $E_i$ of the channels, existing video coding technologies can be used or adapted. In the case of a decomposition by frequency, the low frequency band may be directly coded as a normal video sequence since it retains many properties of the original video content. Because of this, the framework can be used to maintain "backward compatibility" where the low band is independently decoded using current codec technology. The higher bands can be decoded using future developed technology and used together with the low band to reconstruct at a higher quality. Since each channel or band may exhibit different properties from one another, specific channel coding methods can be applied. Interchannel redundancies can also be exploited spatially and temporally to improve coding efficiency. For example, motion vectors, predicted motion vectors, coefficient scan order, coding mode decisions, and other methods may be derived based upon one or more other channels. In this case, the derived values may need to be appropriately scaled or mapped between channels. The principles can be applied to any video codec, can be backward compatible (e.g. low bands), can be for specific channel coding methods (e.g. high bands) and can exploit interchannel redundancies.

For reference picture interpolation, a combination of undecimated half-pel samples, interpolated values, and adapative interpolation filter (AIF) samples for the interpolated positions can be used. For example, some experiments showed it may beneficial to use AIF samples except for high band half-pel positions, where it was beneficial to use the undecimated wavelet samples. Although the half-pel interpolation in Q' can be adapted to the signal and noise characteristics of each channel, a lowpass filter can be used for all channels to generate the quarter-pel values.

It is understood that some features can be adapted in the coding of channels. In an embodiment, the best quantization parameter is chosen for each partition/channel based on RD-cost. Each picture of a video sequence can be partitioned and decomposed into several channels. By allowing different quantization parameters for each partition or channel, the overall performance can be improved.

To perform optimal bit allocation amongst different sub-bands of the same partition or across different partitions, an RD minimization technique can be used. If the measure of fidelity is peak signal-to-noise ratio (PSNR), it is possible to independently minimize the Lagrangian cost (D+λ·R) for each sub-band when the same Lagrangian multiplier (λ) is used to achieve optimal coding of individual channels and partitions.

For the low frequency band that preserves most of the natural image content, its RD curve generated by a traditional video codec maintains a convex property, and a quantization parameter (qp) is obtained by a recursive RD cost search. For instance, at the first step, RD costs at $qp_1=qp$, $qp_2=qp+\Delta$, $qp_3=qp-\Delta$ are calculated. The value of $qp_i$ (i=1, 2, or 3) that has the smallest cost is used to repeat the process where the new qp is set to $qp_i$. The RD costs at $qp_1=qp$, $qp_2=qp+\Delta/2$, $qp_3=qp-\Delta/2$ are then computed, and this is repeated until the qp increment Δ becomes 1.

For high frequency bands, the convex property no longer holds. Instead of the recursive method, an exhaustive search is applied to find the best qp with the lowest RD cost. The encoding process at different quantization parameters from qp−Δ to qp+Δ is then run.

For example, Δ is set to be 2 in the low frequency channel search, and this results in a 5× increase in coding complexity in time relative to the case without RD optimization at the channel level. For the high frequency channel search, Δ is set to be 3, corresponding to a 7× increase in coding complexity.

By the above method, an optimal qp for each channel is determined at the expense of multi-pass encoding and increased encoding complexity. Methods for reducing the complexity can be developed that directly assign qp for each channel without going through multi-pass encoding.

In another embodiment, lambda adjustment can be used for each channel. As mentioned above, the equal Lagrangian multiplier choice for different sub-bands will result in optimum coding under certain conditions. One such condition is that the distortions from all sub-bands are additive with equal weight in formation of the final reconstructed picture. This observation along the knowledge that compression noise for different sub-bands go through different (synthesis) filters, with different frequency dependent gains, suggest that coding efficiency can be improved by assigning a different Lagrangian function for different sub-bands, depending on the spectral shape of compression noise and the characteristics of the filter. For example, this is done by assigning a scaling factor to the channel lambda, where the scaling factor can be an input parameter from the configuration file.

In yet another embodiment, picture type determination can be used. An advanced video coding (AVC) encoder may not be very efficient in coding the high frequency sub-bands. Many microblocks (MB) s in HVC are intra coded in predictive slices, including P and B slices. In some extreme cases, all of MBs in a predictive slice are intra-coded. Since the context model of the intra MB mode is different for different slice types, the generated bit rates are quite different when the sub-band is coded as an I slice, P slice or a B slice. In other words, in natural images, the intra MBs are less likely occur in a predictive slice. Therefore, a context model with a low intra MB probability is assigned. For I slices, a context model with a much higher intra MB probability is assigned. In this case, a predictive slice with all MBs intra-coded consumes more bits than an I slice even when every MB is coded at the same mode. As a consequence, a different entropy coder can be used for high frequency channels. Moreover, each sub-band can use a different entropy coding technique or coder based on the statistical characteristics of each sub-band. Alternatively, another solution is to code each picture in a channel with a different slice type, and then choose the slice type with the least RD cost.

For another embodiment, new intra skip mode for each basic coding unit is used. Intra skip mode benefits sparse data coding for a block-based algorithm where the prediction from already reconstructed neighboring pixels are used to reconstruct the content. High sub-band signals usually contain a lot of flat areas and the high frequency components are sparsely located. It might be advantageous to use one bit to distinguish whether an area is flat or not. In particular, an intra skip mode was defined to indicate an MB with flat content. Whenever an intra skip mode is decided, the area is not coded, no further residual is sent out, and the DC value of the area is predicted by using the pixel values in the neighboring MB.

Specifically, the intra skip mode is an additional MB level flag. The MB can be any size. In AVC, the MB size is 16×16. For some video codecs, larger MB sizes (32×32, 64×64, etc.) for high definition video sequences are proposed. Intra skip mode benefits from the larger MB size because of the potential fewer bits generated from the flat areas. The intra skip mode is only enabled in the coding of the high band signals and disabled in the coding of the low band signals. Because the flat areas in low frequency channel are not as frequent as those in the high frequency channels, generally speaking, the intra skip mode increases the bit rate for low frequency channels while decreasing the bit rate for high frequency channels. The skip mode can also apply to an entire channel or band.

Figure 10:
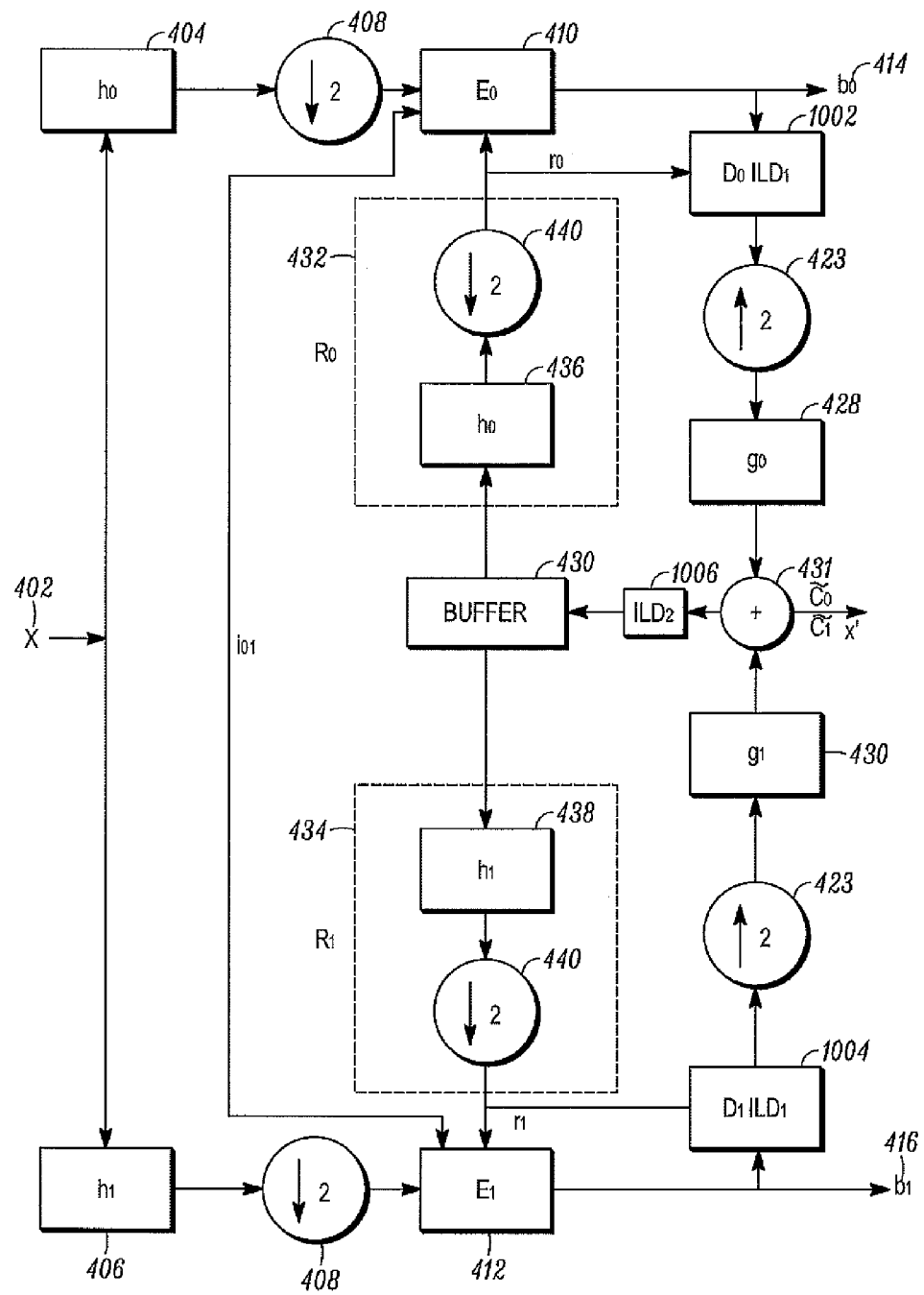
FIG. 10 is an illustration of an encoder incorporating some of the principles of the invention.
Figure 11:
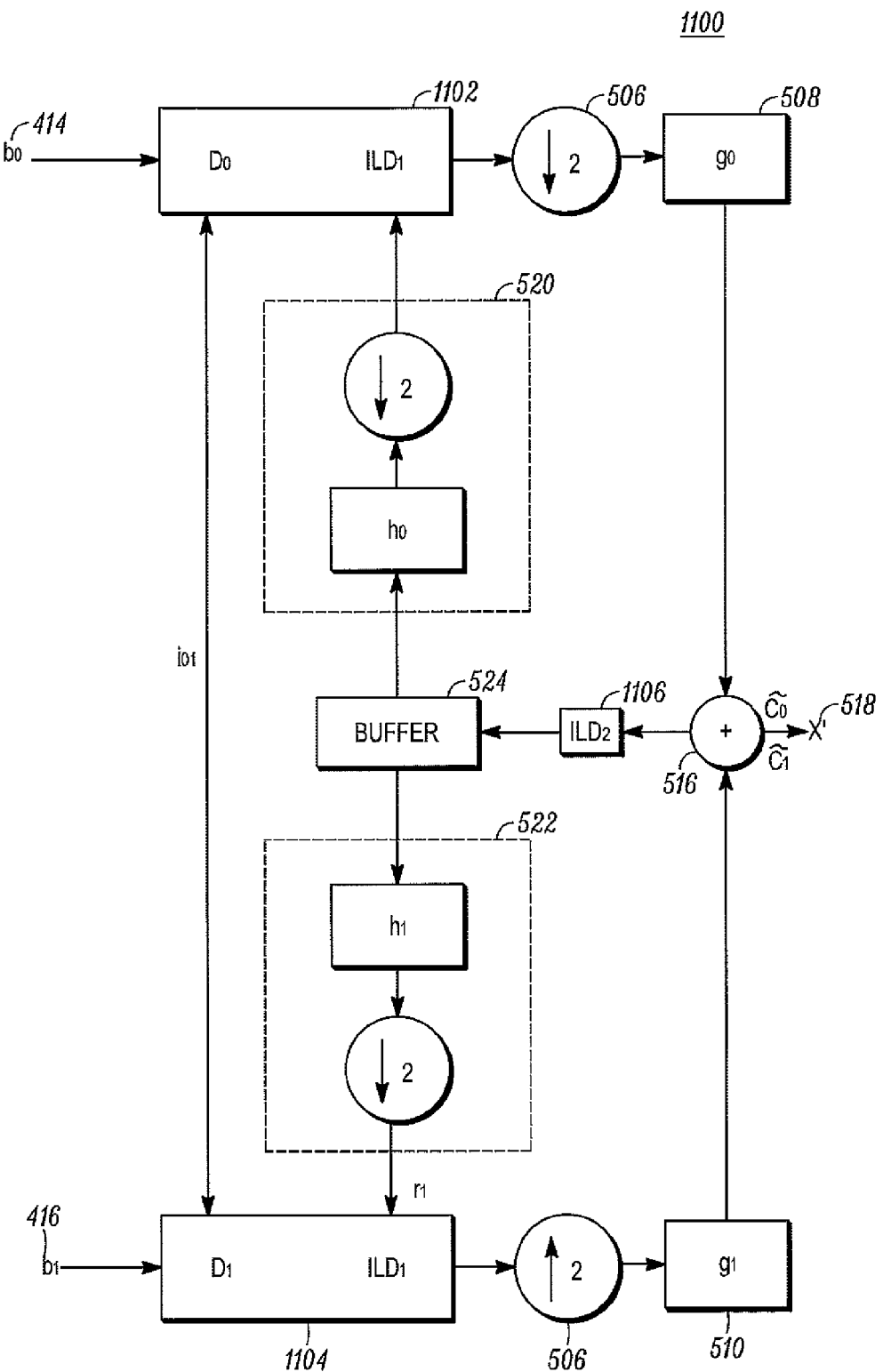
FIG. 11 is an illustration of a decoder corresponding to the encoder shown in FIG. 10.

For yet another embodiment, an inloop deblocking filter is used. An inloop deblocking filter helps the RD performance and the visual quality in the AVC codec. There are two places where the inloop deblocking filter can be placed in the HVC encoder. These are illustrated in FIG. 10 for the encoder, and in FIG. 11 for the corresponding decoder. FIGS. 10 and 11 are configured as the encoder 400 of FIG. 4 and the decoder 500 of FIG. 5 where similar components are numbered similarly and perform the same function as described above. One inloop deblocking filter is a part of the decoder $D_i$ 1002, 1004 at the end of each individual channel reconstruction. The other inloop deblocking filter 1006 is after channel synthesis and the reconstruction of the full picture by combiner 431. The first inloop deblocking filters 1002, 1004 are used for the channel reconstruction and are an intermediate signal. Its smoothness on the MB boundaries may improve the final picture reconstruction in an RD sense. It also can result in the intermediate signals varying further away from the true values so that a performance degradation is possible. To overcome this, the inloop deblocking filters 1002, 1004 can be configured for each channel based on the properties of how that channel is to be synthesized. For example the filters 1002, 1004 can be based on the up sampling direction as well as the synthesis filter type.

On the other hand, the inloop deblocking filter 1006 should be helpful after picture reconstruction. Due to the nature of the sub-band/channel coding, the final reconstructed pictures preserve artifacts other than blockiness, such as ringing effects. Thus, it is better to redesign the inloop filter to effectively treat those artifacts.

It is understood that the principles described for inloop deblocking filters 1002-1006 apply to the inloop deblocking filters 1102, 1104 and 1106 that are found in decoder 1100 of FIG. 11.

In another embodiment, sub-band dependent entropy coding can be used. The legacy entropy coders such as VLC tables and CABAC in conventional codecs (AVC, MPEG, etc.) are designed based on the statistical characteristics from natural images in some transform domain (e.g. DCT in case of AVC which tend to follow some mix of Laplacian and Gaussian distributions). The performance of sub-band entropy coding can be enhanced by using an entropy coder based on the statistical characteristics of each sub-band.

In yet another embodiment, decomposition dependent coefficient scan order can be used. The optimal decompositioning choice for each partition can be indicative of the orientation of features in the partition. Therefore it would be preferable to use a suitable scan order prior to entropy coding of the coding transform coefficients. For example, it is possible to assign a specific scan order to each sub-band for each of the available decomposition schemes. Thus, no extra information needs to be sent to communicate the choice of scan order. Alternatively, it is possible to selectively choose and communicate the scanning pattern of the coded coefficients, such as quantized DCT coefficients in the case of AVC, from a list of possible scan order choices and send this scan order selection for each coded sub-band of each partition. This requires the selection choices be sent for each sub-band of the given decomposition for a given partition. This scan order can also be predicted from the already coded sub-bands with the same directional preference. In addition, fixed scan order per sub-band and per decomposition choice can be performed. Alternatively, a selective scanning pattern per sub-band in a partition can be used.

In an embodiment, sub-band distortion adjustment can be used. Sub-band distortion can be based on the creation of more information from some sub-bands while not producing any information for other sub-bands. Such distortion adjustments can be done via distortion synthesis or by distortion mapping from sub-bands to the pixel domain. In the general case, the sub-band distortion can be first mapped to some frequency domain and then weighted according to the frequency response of the sub-band synthesis process. In conventional video coding schemes, many of the coding decisions are carried out by minimization of a rate-distortion cost. The measured distortion in each sub-band does not necessarily reflect the final impact of the distortion from that sub-band to the final reconstructed picture or picture partition. For perceptual quality metrics, this is more obvious where the same amount of distortion, e.g. MSE in one of the frequency sub-bands would have a different perceptual impact for the final reconstructed image than the same amount of distortion in a different sub-band. For non-subjective quality measures such as MSE, the spectral density of distortion can impact the distortion in the quality of synthesized partition.

To address this, it is possible to insert the noisy block into the otherwise noiseless image partition. In addition, sub-band up-sampling and synthesis filtering may be necessary before calculating the distortion for that given block. Alternatively, it is possible to use a fixed mapping from distortion in sub-band data to a distortion in the final synthesized partition. For perceptual quality metrics, this may involve gathering subjective test results to generate the mapping function. For a more general case, the sub-band distortion can be mapped to some finer frequency sub-bands where the total distortion would be a weighted sum of each sub-sub-band distortion according to the combined frequency response from the upsampling and synthesis filtering.

In another embodiment, range adjustment is provided. It is possible that sub-band data can be a floating point that needs to be converted to integer point with certain dynamic range. The encoder may not be able to handle the floating point input so the input is changed to compensate for what is being received. This can be achieved by using integer implementation of sub-band decomposition via a lifting scheme. Alternatively, a generic bounded quantizer can be used that is constructed by using a continuous non-decreasing mapping curve (e.g. a sigmoid) followed by a uniform quantizer. The parameters for the mapping curves should be known by the decoder or passed to it to reconstruct the sub-band signal prior to upsampling and synthesis.

The HVC described offers several advantages. Frequency sub-band decomposition can provide better band-separation for better spatiotemporal prediction and coding efficiency. Since most of the energy in typical video content is concentrated in a few sub-bands, more efficient coding or band-skipping can be performed for the low-energy bands. Sub-band dependent quantization, entropy coding, and sub-jective/objective optimization can also be performed. This can be used to perform coding according to the perceptual importance of each sub-band. Also, compared to other prefiltering only approaches, a critically sampled decomposition does not increase the number of samples and perfect reconstruction is possible.

From a predictive coding perspective, HVC adds cross sub-band prediction in addition to the spatial and temporal prediction. Each sub-band can be coded using a picture type (e.g. I/P/B slices) different from the other sub-bands as long as it adheres to the picture/partition type (e.g. an Intra type partition can only have Intra type coding for all its sub-bands). By virtue of the decomposition, the virtual coding units and transform units are extended without the need for explicitly designing new prediction modes, sub-partitioning schemes, transforms, coefficient scans, entropy coding, etc.

Lower computational complexity is possible in HVC where time-consuming operations such as, for example, motion estimation (ME), are performed only on the decimated low frequency sub-bands. Parallel processing of sub-bands and decompositions is also possible.

Because the HVC framework is independent of the particular channel or sub-band coding used, it can utilize different compression schemes for the different bands. It does not conflict with other proposed coding tools (e.g. KTA and the proposed JCT-VC) and can provide additional coding gains on top of other coding tools.

The principles of HVC described above for 2D video streaming can also apply to 3D video outputs such as for 3DTV. HVC can also take most advantage of the 3DTV compression technologies, newer encoding and decoding hardware is required. Because of this, there has been recent interest in systems that provide a 3D compatible signal using existing 2D codec technology. Such a "base layer" (BL) signal would be backward compatible with existing 2D hardware, while newer systems with 3D hardware can take advantage of additional "enhancement layer" (EL) signals to deliver higher quality 3D signals.

One way to achieve such migration path coding to 3D is to use a side-by-side or top/bottom 3D panel format for the BL, and use the two full resolution views for the EL. The BL can be encoded and decoded using existing 2D compression such as AVC with only small additional changes to handle the proper signaling of the 3D format (e.g. frame packing SEI messages and HDMI 1.4 signaling). Newer 3D systems can decode both BL and EL and use them to reconstruct the full resolution 3D signals.

For 3D video coding the BL and the EL may have concatenating views. For the BL, the first two views, e.g. left and right views, may be concatenated and then the concatenated 2× picture would be decomposed to yield the BL. Alternatively, a view can be decomposed and then the low frequency sub-bands from each view can be concatenated to yield the BL. In this approach the decomposition process does not mix information from either view. For the EL, the first two views may be concatenated and then the concatenated 2× picture would be decomposed to yield the enhancement layer. Each view may be decomposed and then coded by one enhancement layer or two enhancement layers. In the one enhancement layer embodiment, the high frequency sub-bands for each view would be concatenated to yield the EL as large as the base layer. In the two layer embodiment, the high frequency sub-band for one view would be coded first, as the first enhancement layer and then the high frequency sub-band for the other view would be coded as the second enhancement layer. In this approach the EL_1 can use the already coded EL_0 as a reference for coding predictions.

Figure 12:
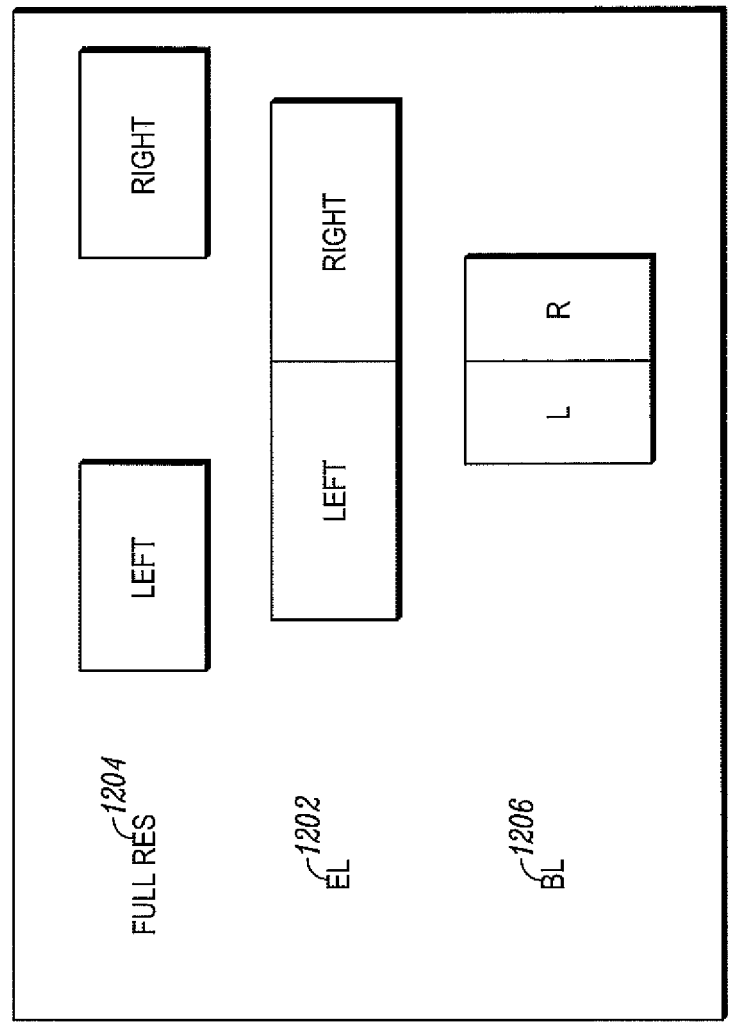
FIG. 12 is an illustration of 3D encoding.

FIG. 12 shows the approach to migration path coding using scalable video coding (SVC) compression 1200 for the side-by-side case. As can be understood, the extension to other 3D formats (e.g. top/bottom, checkerboard, etc.) is straightforward. Thus, the description focuses on the side-by-side case. The EL 1202 is a concatenated double-width version of the two full resolution views 1204, while the BL 1206 is generally a filtered and horizontally subsampled version of the EL 1204. SVC spatial scalability tools can then be used to encode the BL 1206 and EL 1204, where the BL is AVC-encoded. Both full resolution views can be extracted from the decoded EL.

Figure 13:
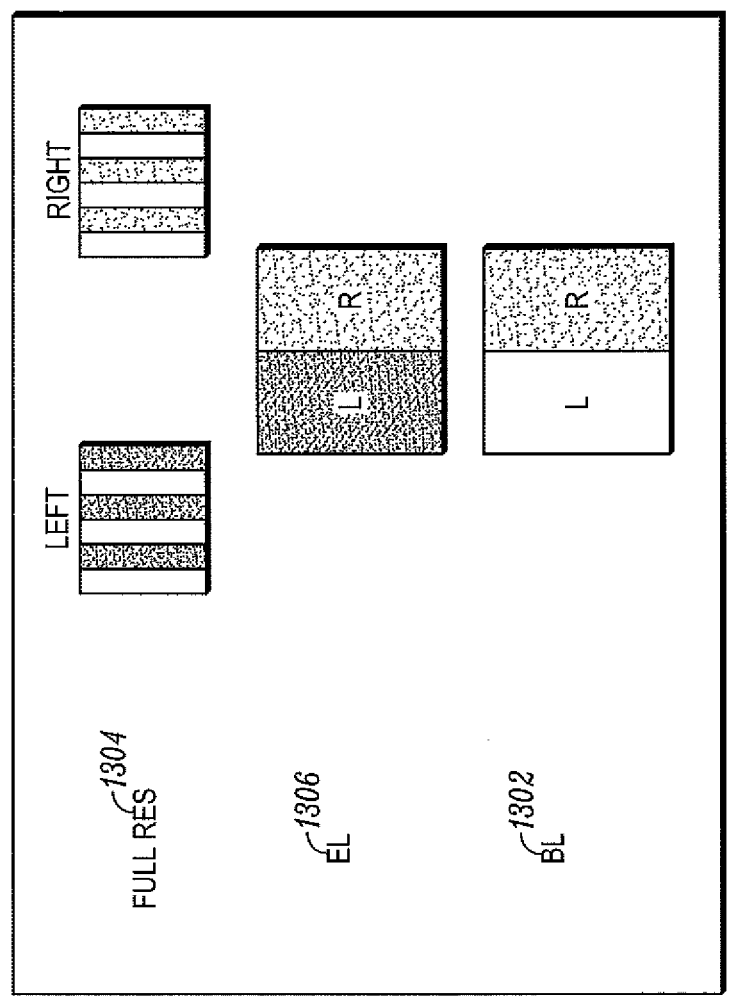
FIG. 13 is another illustration of 3D encoding.

Another possibility for migration path coding is to use multiview video coding (MVC) compression. In the MVC approach, the two full resolution views are typically sampled without filtering to produce two panels. In FIG. 13, the BL panel 1302 contains the even columns of both the left and right views in the full resolution 1304. The EL panel 1306 contains the odd columns of both views 1304. It is also possible for the BL 1302 to contain the even column of one view and the odd column of the other view, or vice-versa, while the EL 1306 would contain the other parity. The BL panel 1302 and EL panel 1306 can then coded as two views using MVC, where the GOP coding structure is chosen so that the BL is the independent AVC-encoded view, while the EL is coded as a dependent view. After decoding both BL and EL, the two full resolution views can be generated by appropriately re-interleaving the BL and EL columns. Pre-filtering is typically not performed in generating the BL and EL views so that the original full resolution views can be recovered in the absence of coding distortion.

Figure 14:
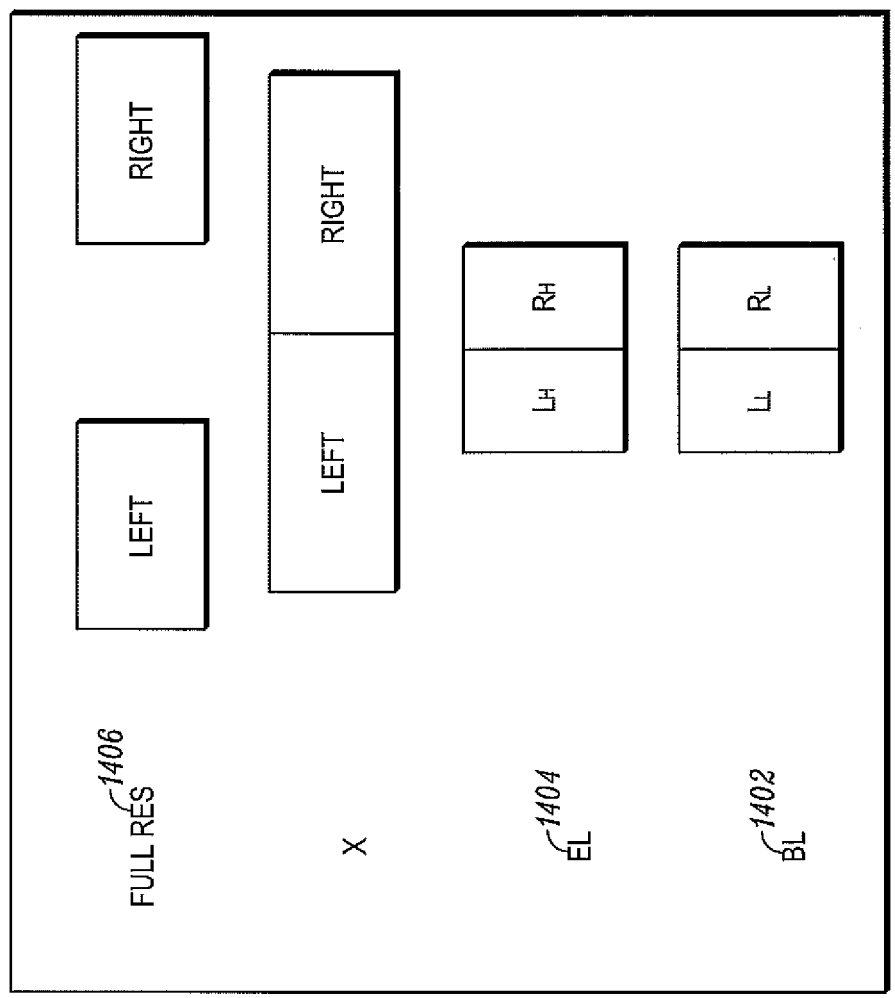
FIG. 14 is yet another illustration of 3D encoding.

Turning to FIG. 14, it is possible to apply HVC in migration path 3DTV coding since typical video content tends to be low-frequency in nature. When the input to HVC is a concatenated double-width version of the two full resolution views, the BL 1402 is the low frequency band in a 2-band horizontal decomposition (for the side-by-side case) of the full resolution view 1406, and the EL 1404 can be the high frequency band.

Figure 15:
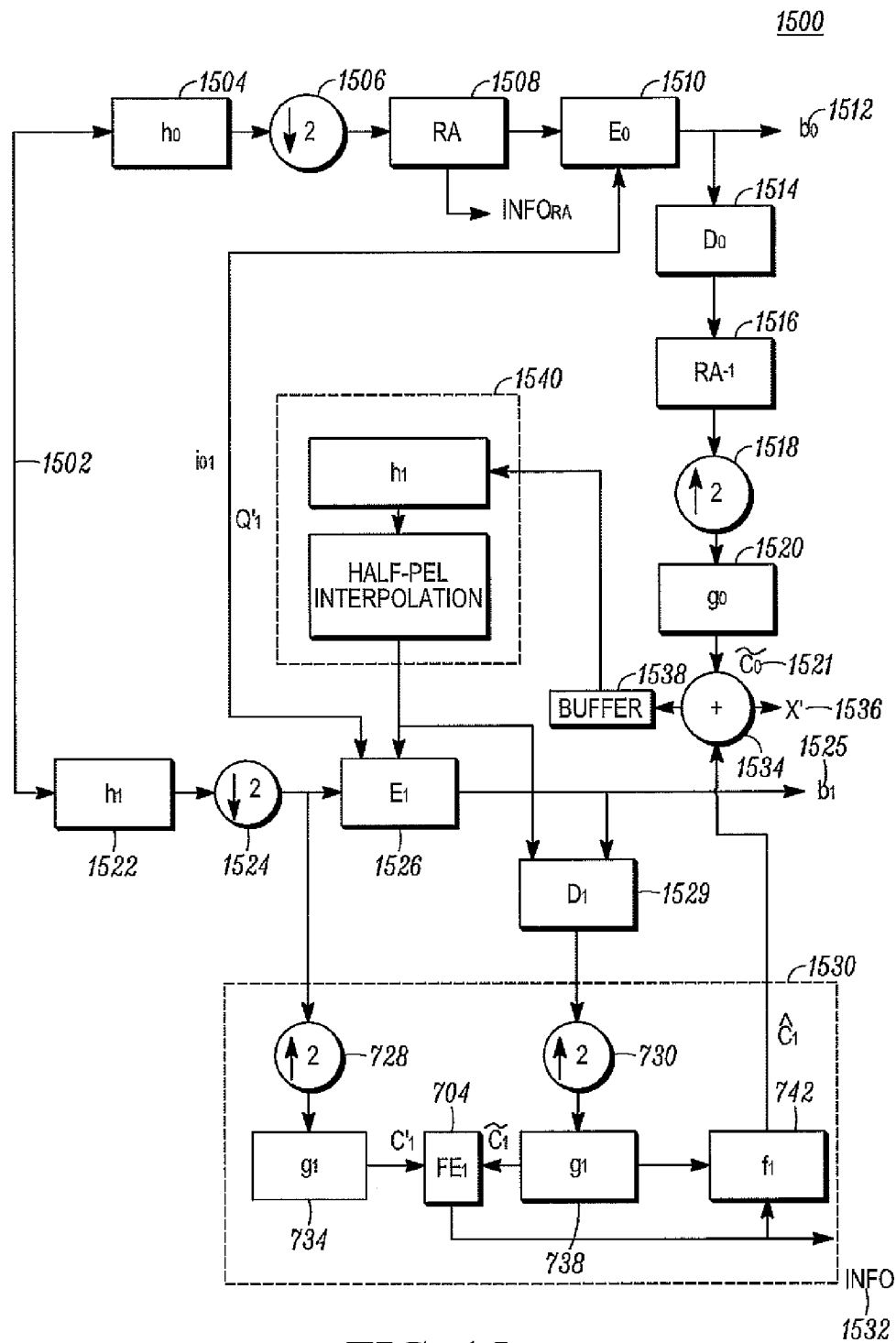
FIG. 15 is an illustration of an encoder incorporating some of the principles of the invention.

This HVC approach to 3DTV migration path coding by encoder 1500 is shown in FIG. 15, which is an application and special case of the general HVC approach. As seen, many of the principles discussed above are included in the migration path for this 3DTV approach. A low frequency encoding path using of input video coding stream x 1502 is shown using some of the principles described in connection with FIG. 4. Since it is desired that the BL be AVC-compliant, the top low-frequency channel in FIG. 15 uses AVC tools for encoding. A path of the stream x 1502 is filtered using filter $h_0$ 1504 and decimated by sampler 1506. A range adjustment module 1508 restricts the range of the base layer as described in more detail below. Information $info_{RA}$ can be used by the encoder shown, the corresponding decoder (see FIG. 16) as well as other encoders etc. as described above. The restricted input signal is then provided to encoder $E_0$ 1510 to produce bitstream $b_0$ 1512. Coding information $i_{01}$ which contains information regarding the high and low band signals form the encoder, decoder or other channels is provided to the encoder 1526 to improve the performance. As is understood, the bitstream $b_0$ can be reconstructed using a reconstruction loop. The reconstruction loop includes a complementary decoder $D_0$ 1514, range adjustment module $RA^{-1}$ 1516, sampler 1518 and filter $g_0$ 1520.

A high frequency encoding path is also provided, which is described in connection with FIG. 7. Unlike the low frequency channel discussed above, the high frequency channel can use additional coding tools such as undecimated interpolation, ASF, cross sub-band mode and motion vector prediction, Intra Skip mode, etc. The high frequency channel can even be coded dependently where one view is independently encoded and the other view is dependently encoded. As described in connection with FIG. 7, the high frequency band includes the filter $h_1$ 1522 that filters the high frequency input stream x that is then decimated by sampler 1524. Encoder $E_1$ 1526 encodes the filtered and decimated signal to form bitstream $b_1$ 1525.

Like the low frequency channel, the high frequency channel includes a decoder $D_1$ 1529 which feeds a decoded signal to the interpolation module 1530. The interpolation module 1530 is provided for the high frequency channel to produce information $info_1$ 1532. The interpolation module 1530 corresponds to the interpolation module 726 shown in FIG. 7 and includes samplers 728, 730, filters $g_1$ 734, 738, FE1 filter 704, and filter $f_1$ 742 to produce information $info_1$. The output from the decoded low frequency input stream 1521 and from the interpolation module 1530 are combined by combiner 1534 to produce the reconstructed signal x' 1536.

The reconstructed signal x' 1536 is also provided to the buffer 1538, which is similar to the buffers described above. The buffered signal can be supplied to reference picture processing module $Q'_1$ 1540 as described in connection with FIG. 9B. The output of the reference picture processing module is supplied to the high frequency encoder $E_1$ 1526. As shown, the information $i_{01}$ from the reference picture processing module that includes coding the low frequency channel can be used in coding the high frequency channel, but not necessarily vice-versa.

Since the BL is often constrained to be 8 bits per color component in 3DTV, it is important that the output of the filter $h_0$ (and decimation) be limited in bit-depth to 8 bits. One way to comply with restricted dynamic range of the base layer is to use some Range Adjustment (RA) operation performed by RA module 1508. The RA module 1508 is intended to map the input values into the desired bit-depth. In general the RA process can be accomplished by a Bounded Quantization (uniform or non-uniform) of the input values. For example, one possible RA operation can be defined as $$RAout = clip(round(scale*RAin + offset)),$$

where round( ) approximates to the nearest integer, and clip( ) limits the range of values to [min, max] (e.g. [0, 255] for 8 bits), and scale≠0. Other RA operations can be defined, including ones that operate simultaneously on a group of input and output values. The RA parameter information needs to be sent to the decoder (as $info_{RA}$) if these parameters are not fixed or somehow are not known to the decoder. The "inverse" $RA^{-1}$ module 1516 rescales the values back to the original range, but of course with some possible loss due to rounding and clipping in the forward RA operation, where:

$$RA^{-1}out = (RA^{-1}in - offset)/scale.$$

Range adjustment of the BL provides for acceptable visual quality by scaling and shifting the sub-band data, or by using a more general nonlinear transformation. In an embodiment of fixed scaling, a fix scaling is set such that the dc gain of synthesis filter and scaling is one. In adaptive scaling and shifting two parameters of scale and shift for each view are selected such that the normalized histogram of that view in the BL has the same mean and variance as the normalized histogram of the corresponding original view.

Figure 16:
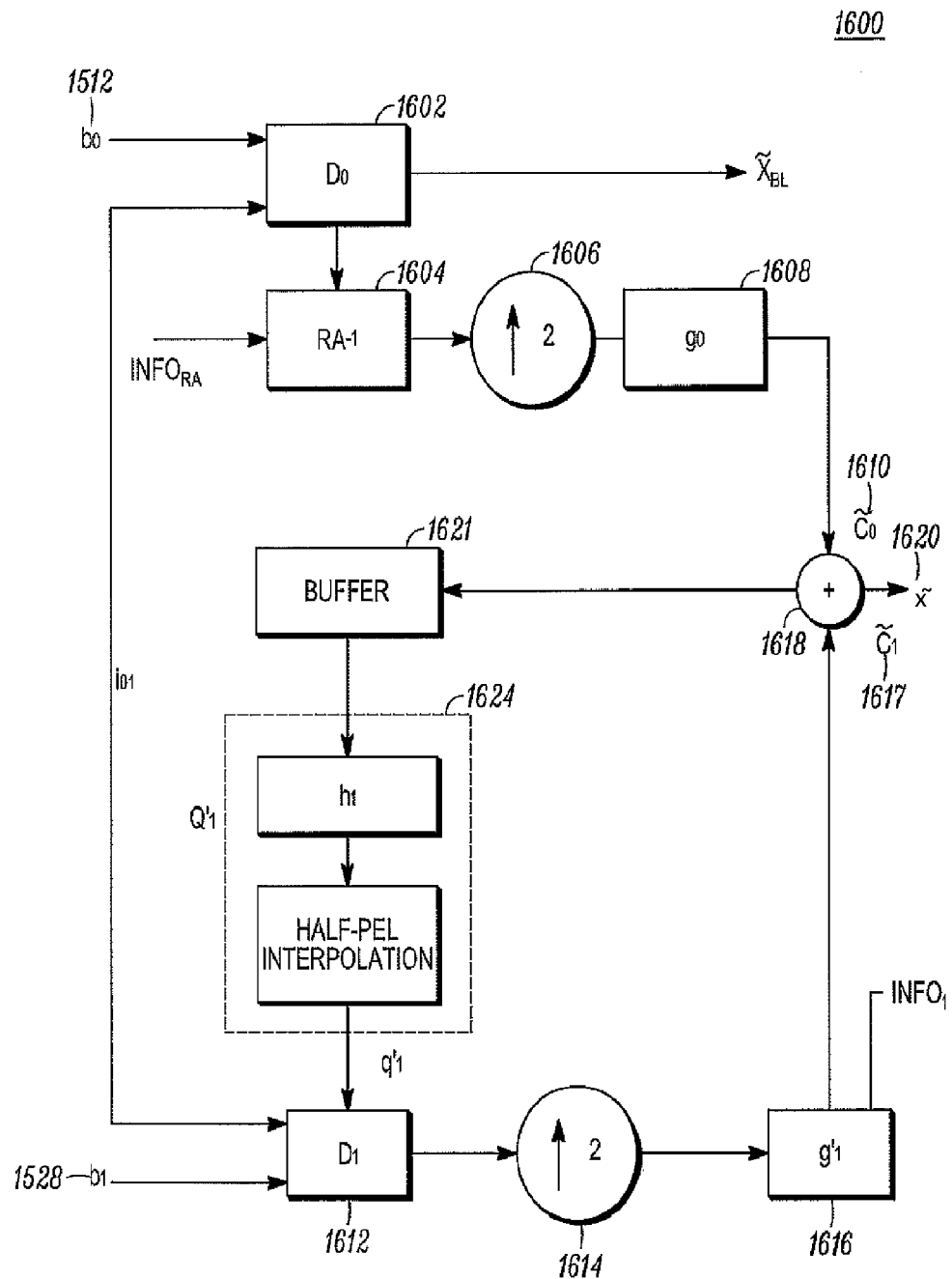
FIG. 16 is an illustration of decoder corresponding to the encoder shown in FIG. 15.

The corresponding decoder 1600 shown in FIG. 16 also performs the $RA^{-1}$ operation, but only for purposes of reconstructing the double-width concatenated full resolution views, as the BL is assumed to be only AVC decoded and output. The decoder 1600 includes a low frequency channel decoder $D_0$ 1602 which can produce a decoded video signal $\tilde{x}_{bl}$ for the base layer. The decoded signal is supplied to the reverse range adjustment module $RA^{-1}$ 1604 that is resampled by sampler 1606 and filtered by filter $g_0$ 1608 to produce the low frequency reconstructed signal $\tilde{c}_0$ 1610. For the high frequency path, the decoder $D_1$ 1612 decodes the signal that is then resampled by sampler 1614 and filtered by filter $g'_1$ 1616. Information $info_t$ can be provided to the filter 1616. The output of the filter 1616 produces reconstructed signal $\tilde{c}_1$ 1617. The reconstructed low frequency and high frequency signals are combined by combiner 1618 to create the reconstructed video signal $\tilde{x}$ 1620. The reconstructed video signal $\tilde{x}$ 1620 is supplied to the buffer 1621 to be used by other encoders and decoders. The buffered signal can also be provided to a reference picture processing module 1624 that is fed back into the high frequency decoder $D_1$.

The specific choice of RA modules can be determined based on perceptual and/or coding efficiency considerations and tradeoffs. From a coding efficiency point of view, it is often desirable to make use of the entire output dynamic range specified by the bit-depth. Since the input dynamic range to RA is generally different for each picture or partition, the parameters that maximize the output dynamic range will differ among pictures. Although this may not be a problem from a coding point of view, it may cause problems when the BL is decoded and directly viewed, as the $RA^{-1}$ operation may not be performed before being viewed, possibly leading to variations in brightness and contrast. This is in contrast to the more general HVC, where the individual channels are internal and not intended to be viewed. An alternative solution to remedy the loss of information, associated with the RA process, is to use an integer implementation of sub-band coding using a lifting scheme which brings the base band layer to the desired dynamic range.

If the AVC-encoded BL supports the adaptive range scaling per picture or partition $RA^{-1}$ (such as through SEI messaging), then the RA and $RA^{-1}$ operations can be chosen to optimize both perceptual quality and coding efficiency. In the absence of such decoder processing for the BL and/or information about the input dynamic range, one possibility is to choose a fixed RA to preserve some desired visual characteristic. For example, if the analysis filter $h_0$ 1504 has a DC gain of $\alpha \neq 0$, a reasonable choice of RA in module 1508 is to set gain=$1/\alpha$ and offset=0.

It is worth noting that although it is not shown in FIGS. 15 and 16, the EL can also undergo similar RA and $RA^{-1}$ operations. However, the EL bitdepth is typically higher than that required by the BL. Also, the analysis, synthesis, and reference picture filtering of the concatenated double-width picture by $h_i$ and $g_i$ in FIGS. 15 and 16 can be performed so that there is no mixing of views around the view border (in contrast to SVC filtering). This can be achieved, for example, by symmetric padding and extension of a given view at the border, similar to that used at the other picture edges.

In view of the foregoing, the discussed HVC video coding provides a framework that offers many advantages and flexibility from traditional pixel domain video coding. An application of the HVC coding approach can used to provide a scalable migration path to 3DTV coding. Its performance appears to provide some promising gains compared to other scalable approaches such as SVC and MVC. It uses existing AVC technology for the lower resolution 3DTV BL, and allows for additional tools for improving coding efficiency of the EL and full resolution views.

Figure 17:
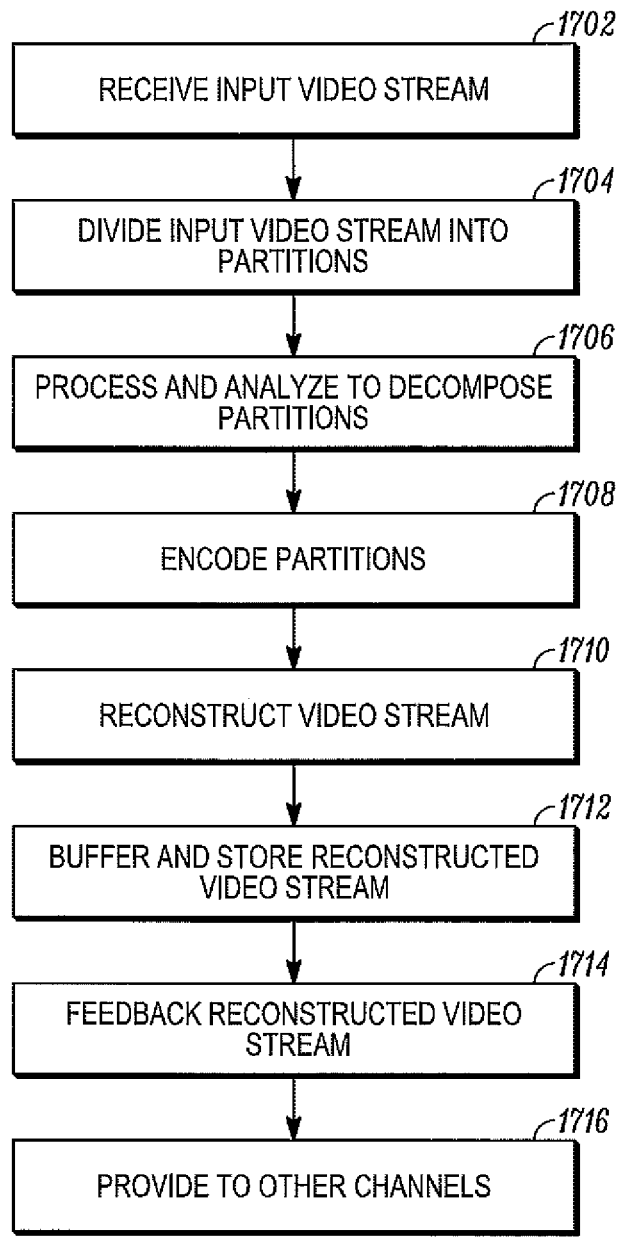
FIG. 17 is a flow chart showing the operation of encoding an input video stream according to some embodiments of the invention.

Turning to FIG. 17, the devices described above perform a method 1700 of encoding an input video stream. The input video stream is received 1702 at a head end of a video distribution system described and is divided 1704 into a series of partitions based on at least one feature set of the input video stream. The feature set can be any type of features of the video stream including features of the content, context, quality and coding functions of the video stream. In addition, the input video stream can be partitioned according to the various channels of the video stream such that each channel is separately divided according to the same or different feature sets. After dividing, the partitions of the input video stream are processed and analyzed to decompose 1706 the partitions for encoding by such operations as decimation and sampling of the partitions. The decomposed partitions are then encoded 1708 to produced encoded bitstreams. As a part of the encoding process, coding information can be provided to the encoder. The coding information can include input information from the other channels of the input video stream as well as coding information based on a reconstructed video stream. Coding information can also include information regarding control and quality information about the video stream as well as information regarding the feature sets. In an embodiment, the encoded bitstream is reconstructed 1710 into a reconstructed video stream which can be buffered and stored 1712. The reconstructed video stream can be fed back 1714 into the encoder and used as coding information as well as provided 1716 to encoders for other channels of the input video stream. As understood from the description above, the process of reconstructing the video stream as well as providing the reconstructed video stream as coding information can include the processes of analyzing and synthesizing the encoded bitstreams and reconstructed video stream.

Figure 18:
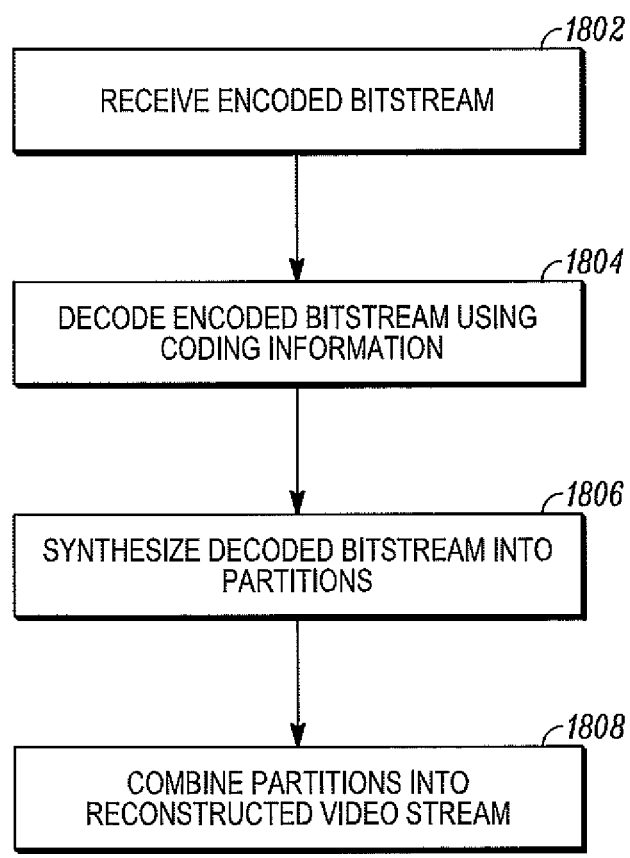
FIG. 18 is a flow chart showing the operation of decoding an encoded bitstream according to some embodiments of the invention.

FIG. 18 is a flow chart that illustrates a method 1800 of decoding encoded bitstreams that are formed as a result of the method shown in FIG. 17. The encoded bitstreams are received 1802 by a subscriber unit 150*a-n* as a part of a video distribution system. The bitstreams are decoded 1804 using coding information that is received by the decoder. The decoding information can be received as a part of the bitstream or it can be stored by the decoder. In addition, the coding information can be received from different channels for the video stream. The decoded bitstream is then synthesized 1806 into a series of partitions that are then combined 1808 to create a reconstructed video stream that corresponds to the input video stream described in connection with FIG. 17.

Yet another implementation makes use of a decomposition of the input video into features that can be both efficiently represented and better matched to perception of the video. Although the most appropriate decomposition may depend on the characteristics of the video, this contribution focuses on a decomposition for a wide variety of content including typical, natural video. FIG. 19 illustrates the decomposition of the input x into two layers through analysis filtering. In this example, the filtering separates x into different spatial frequency bands. Although the input x can correspond to a portion of a picture or to an entire picture, the focus in this contribution is on the entire picture. For typical video, most of the energy can be concentrated in the low frequency layer $l_0$ as compared to the high frequency layer $l_1$. Also, $l_0$ tends to capture local intensity features while $l_1$ captures variational detail such as edges.

Each layer $l_i$ can then be encoded with $E_i$ to produce bitstream $b_i$. For spatial scalability, the analysis process can include filtering followed by subsampling so that $b_0$ can correspond to an appropriate base layer bitstream. As an enhancement bitstream, $b_1$ can be generated using information from the base layer $b_0$ as indicated by the arrow from $E_0$ to $E_1$. The combination of $E_0$ and $E_1$ is referred to as the overall scalable encoder $E_s$.

The scalable decoder $D_s$ can consist of base layer decoder $D_0$ and enhancement layer decoder $D_1$. The base layer bitstream $b_0$ can be decoded by $D_0$ to reconstruct the layer $l'_0$. The enhancement layer bitstream $b_1$ can be decoded by $D_1$ together with possible information from $b_0$ to reconstruct the layer $l'_1$. The two decoded layers, $d'_0$ and $d'_1$ can then used to reconstruct x' using a synthesis operation.

To illustrate the proposed embodiments for spatial scalability, critical sampling was used in a two-band decomposition at the picture level. Both horizontal and vertical directions were subsampled by a factor of two, resulting in a four layer scalable system. Simulations were performed using HM 2.0 for both encoders Ei and decoders Di. Although it is possible to improve coding efficiency by exploiting correlations among the layers, these simulations do not make use of any interlayer prediction.

The performance of the proposed implementation was compared to the single layer and simulcast cases. In the single layer case, x is encoded using HM 2.0 directly. In the simulcast case, the bitrate is determined by adding together the bits for encoding x directly and the bits for encoding $l_0$ directly, while the PSNR is that corresponding to the direct encoding of x. In the proposed implementation, the bitrate corresponds to the bits for all layers, and the PSNR is that for x'.

Efficient representation: By utilizing critically sampled layers, the encoders $E_i$ in this example operate on the same total number of pixels as the input x. This is in contrast to SVC, where for spatial scalability there is an increase in the total number of pixels to be encoded, and the memory requirement is also increased.

General spatial scalability: The implementation can extend to other spatial scalability factors, for example, 1:n. Because the layers can have the same size, there can be a simple correspondence in collocated information (e.g. pixels, CU/PU/TU, motion vectors, coding modes, etc.) between layers. This is in contrast to SVC, where the size (and possibly shape) of the layers are not the same, and the correspondence in collocated information between layers may not be as straightforward.

Sharpness enhancement: The implementations herein can be used to achieve sharpness enhancement as additional layers provide more detail to features such as edges. This type of sharpness enhancement is in contrast to other quality scalable implementations that improve quality only by changes in the amount of quantization.

Independent coding of layers: The simulation results for spatial scalability indicate that it is possible to perform independent coding of layers while still maintaining good coding efficiency performance. This makes parallel processing of the layers possible, where the layers can be processed simultaneously. For the two-layer spatial scalability case with SVC, independent coding of the layers (no inter-layer prediction) would correspond to the simulcast case. Note that with independent coding of layers, errors in one layer do not affect the other layers. In addition, a different encoder $E_i$ can be used to encode each $l_i$ to better match the characteristics of the layer.

Dependent coding of layers: In the implementations disclosed herein, dependent coding of layers can improve coding efficiency. When the layers have the same size, sharing of collocated information between layers is simple. It is also possible to adaptively encode layers dependently or independently to trade-off coding efficiency performance with error resiliency performance.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. An apparatus comprising:
  a divider to segment an input video stream into a plurality of partitions;
  a channel analyzer coupled to the divider wherein the channel analyzer decomposes each of the plurality of partitions into at least two sub-bands using spatial frequency decomposition, wherein the channel analyzer includes a respective sampler that samples a respective partition by a factor corresponding to a number of sub-bands so that a total number of samples in all sub-bands is the same as the number of input samples of the input video stream; and
  a plurality of encoders coupled to the channel analyzer, each encoder of the plurality of encoders configured to encode one of the at least two sub-bands into an encoded bitstream to produce a plurality of encoded bitstreams,
  wherein each encoder utilizes coding information from at least one of the two sub-bands in encoding the at least two sub-bands to form the plurality of encoded bitstreams; and
  a reconstruction loop to decode the plurality of encoded bitstreams to form a reconstructed video stream for reference picture processing, the reconstruction loop comprising:
    a plurality of decoders receiving the plurality of encoded bitstreams, each decoder of the plurality of decoders configured to decode one of the at least two sub-bands forming a respective bitstream according to the coding information; and
    a plurality of interpolation modules, each interpolation module coupled to an output of a respective decoder before combining the decoded bitstreams to form the reconstructed video stream, each interpolation module including a filter estimation module performing filter estimation between a respective unencoded sub-band and its decoded sub-band to provide filter information such that the reconstructed video stream for reference picture processing has a higher bit-depth resolution than a final output bit-depth resolution.

2. The apparatus according to claim 1 further comprising a buffer to store the reconstructed video stream.

3. The apparatus according to claim 1 wherein at least one of the reconstructed video streams is used as the coding information for the plurality of encoders.

4. The apparatus according to claim 1 wherein the divider uses at least one of a plurality of feature sets to form the partitions.

5. The apparatus of claim 1 wherein the coding information is reference picture information determined from the reference picture processing.

6. An apparatus comprising:
  a plurality of decoders receiving a plurality of encoded bitstreams, each decoder of the plurality of decoders configured to decode one of at least two sub-bands forming a respective bitstream according to received coding information regarding at least one of the two sub-bands, wherein the plurality of decoders includes at least a first decoder decoding a low frequency sub-band forming a first encoded bitstream and a second decoder decoding a high frequency sub-band forming a second encoded bitstream;
  a channel synthesizer coupled to each decoder of the plurality of decoders to synthesize the decoded at least two sub-bands into a plurality of partitions of a video stream, the channel synthesizer including a respective up-sampler that upsamples a respective partition by a factor corresponding to a number of sub-bands and having a respective filter that applies filter information to a respective upsampled partition, the filter information received with the plurality of bitstreams and provided by a respective filter estimation module when encoding the plurality of bitstreams; and a combiner coupled to the channel synthesizer to create a reconstructed video stream from the plurality of upsampled and filtered partitions.

7. The apparatus according to claim 6 wherein the coding information includes at least one of the reconstructed video stream and coding information for the reconstructed video stream.

8. The apparatus according to claim 6 further comprising a buffer coupled to the combiner wherein the buffer stores the reconstructed video stream.

9. The apparatus according to claim 8 further comprising a filter coupled between the buffer and each of the decoders to feed back at least a part of the reconstructed video stream to each of the decoders as coding information.

10. The apparatus according to claim 6 wherein the partitions are determined based on at least one of a plurality of feature sets of an input video stream corresponding to the reconstructed video stream.

11. A method comprising:
receiving an input video stream;
partitioning the input video stream into a plurality of partitions;
decomposing each of the plurality of partitions into at least two sub-bands using spatial frequency decomposition, including sampling a respective partition by a factor corresponding to a number of sub-bands so that a total number of samples in all sub-bands is the same as the number of input samples of the input video stream;
encoding each of the at least two sub-bands into an encoded bitstream to produce a plurality of encoded bitstreams using a respective encoder, wherein each encoder uses coding information from at least one of the two sub-bands in encoding the at least two sub-bands to form the plurality of encoded bitstreams; and
decoding the plurality of encoded bitstreams to form a reconstructed video stream for reference picture processing in a reconstruction loop by:
decoding, using a respective decoder of a plurality of decoders, each of the at least two sub-bands forming a respective bitstream according to the coding information;
performing filter estimation between a respective unencoded sub-band and a decoded sub-band to provide filter information such that the reconstructed video stream for reference picture processing has a higher bit-depth resolution than a final output bit-depth resolution; and
combining the filtered, decoded bitstreams to form the reconstructed video stream.

12. The method of claim 11 wherein the encoding further includes receiving the reconstructed video stream derived from the encoded bitstreams as an input to the plurality of encoders.

13. The method of claim 11 further comprising buffering the reconstructed video stream reconstructed from the encoded bitstreams to be used as the coding information.

14. The method of claim 11 wherein the coding information is reference picture information from the reconstructed video stream.

15. A method comprising:
receiving a plurality of encoded bitstreams;
decoding the plurality of encoded bitstreams using a plurality of decoders by decoding each one of at least two sub-bands forming a respective bitstream according to received coding information regarding at least one of the two sub-bands, wherein the plurality of decoders includes at least a first decoder decoding a low frequency sub-band forming a first encoded bitstream and a second decoder decoding a high frequency sub-band forming a second encoded bitstream;
synthesizing the decoded at least two sub-bands into a plurality of partitions of the input video stream, including upsampling a respective partition using a respective sampler by a factor corresponding to a number of sub-bands and subsequently filtering a respective upsampled partition using filter information received with the plurality of bitstreams and provided by a respective filter estimation module when encoding the plurality of bitstreams; and
combining of plurality of upsampled and filtered partitions into a reconstructed video stream.

16. The method according to claim 15 wherein the coding information is at least one of reference picture information and coding information of the input video stream.

17. The method according to claim 15 further comprising using the reconstructed video stream as input for decoding the bitstreams.

18. The method according to claim 17 further comprising synthesizing the reconstructed video stream for decoding the bitstream.

* * * * *